US009710136B2

(12) United States Patent
Roh et al.

(10) Patent No.: US 9,710,136 B2
(45) Date of Patent: Jul. 18, 2017

(54) MOBILE TERMINAL HAVING VIDEO PLAYBACK AND METHOD FOR CONTROLLING OF THE SAME

(71) Applicant: LG ELECTRONICS INC., Seoul (KR)

(72) Inventors: Hyeongseok Roh, Seoul (KR); Taeyoung Jeon, Seoul (KR); Rajaram M, Seoul (KR); Sungchae Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 581 days.

(21) Appl. No.: 13/947,318

(22) Filed: Jul. 22, 2013

(65) Prior Publication Data

US 2014/0026051 A1    Jan. 23, 2014

(30) Foreign Application Priority Data

Jul. 23, 2012  (KR) .......................... 10-2012-0080008
Jul. 30, 2012  (KR) .......................... 10-2012-0083045

(51) Int. Cl.
*G06F 3/00* (2006.01)
*G06F 3/0484* (2013.01)
*G06F 17/30* (2006.01)

(52) U.S. Cl.
CPC ...... *G06F 3/0484* (2013.01); *G06F 17/30849* (2013.01)

(58) Field of Classification Search
CPC ............ G06F 3/0484; G06F 17/30852; G06F 17/30817; G06F 17/30855; G06F 17/30846; G06F 17/30849; H04N 21/482; H04N 21/47217; G11B 27/022; G11B 27/031; G11B 27/06; G11B 27/036; G06K 9/00765

See application file for complete search history.

(56) References Cited

U.S. PATENT DOCUMENTS

| | | | | |
|---|---|---|---|---|
| 6,681,043 | B1* | 1/2004 | Lau | ........................ G06F 3/0481 375/E7.076 |
| 2008/0080743 | A1* | 4/2008 | Schneiderman | .. G06F 17/30793 382/118 |
| 2008/0127270 | A1* | 5/2008 | Shipman | ........... G06F 17/30843 725/46 |

(Continued)

FOREIGN PATENT DOCUMENTS

| | | |
|---|---|---|
| CN | 101359334 A | 2/2009 |
| CN | 101790049 A | 7/2010 |

(Continued)

*Primary Examiner* — Kieu Vu
*Assistant Examiner* — Asteway T Gattew
(74) *Attorney, Agent, or Firm* — Birch, Stewart, Kolasch & Birch, LLP

(57) ABSTRACT

A mobile terminal is disclosed. The mobile terminal recognizes at least one object from video contents including at least one object and displays an object progress bar capable of independently controlling frames including a recognized object. Also, by manipulating the object progress bar according to a predetermined pattern, frames including an object corresponding to the object progress bar from among the whole frames of the video contents can be edited and stored more easily.

20 Claims, 47 Drawing Sheets

(56) References Cited

U.S. PATENT DOCUMENTS

| | | | |
|---|---|---|---|
| 2008/0131073 A1* | 6/2008 | Ogawa | G06F 17/30793 386/278 |
| 2009/0037477 A1 | 2/2009 | Choi et al. | |
| 2010/0082585 A1* | 4/2010 | Barsook | G06F 17/3079 707/706 |
| 2011/0249861 A1* | 10/2011 | Tokutake | G06F 17/3079 382/103 |
| 2012/0198337 A1* | 8/2012 | Flint | G11B 27/34 715/723 |
| 2013/0325466 A1* | 12/2013 | Babin | H04N 21/482 704/235 |

FOREIGN PATENT DOCUMENTS

| | | |
|---|---|---|
| EP | 2 453 371 A2 | 5/2012 |
| KR | 10-2010-0004753 A | 10/2010 |

* cited by examiner (touch releasing)

(Long Touch)

(Touch & Drag)

(a)

(b)

MOBILE TERMINAL HAVING VIDEO PLAYBACK AND METHOD FOR CONTROLLING OF THE SAME

CROSS-REFERENCE TO RELATED APPLICATIONS

Pursuant to 35 U.S.C. §119(a), this application claims the benefit of earlier filing date and right of priority to Korean Patent Applications No. 10-2012-0080008, filed on 23 Jul. 2012, No. 10-2012-0083045, filed on 30 Jul. 2012, the contents of which are incorporated by reference herein in their entirety.

BACKGROUND

Field of the Invention

The present invention relates to a mobile terminal and method for controlling the mobile terminal providing a user interface for controlling playback of a video by using an object included in the video.

The present invention relates to a mobile terminal and more particularly, a mobile terminal and method for controlling the mobile terminal capable of separating a selected object from its original position and displaying the separated object at another position.

Discussion of the Related Art

As functions of mobile terminals such as personal computers, laptop computers, cellular phones, and the like are diversified, the mobile terminals are now rendered into multimedia players having multiple functions for capturing pictures or moving images, playing music, moving image files, games, and receiving broadcasting programs.

Terminals can be classified into mobile terminals and stationary terminals. Mobile terminals can be further divided into two types depending on their portability: handheld terminals and vehicle mounted terminals.

To support and enhance the increasing number of functions in a terminal, improving structural part and/or software part of the terminal is now being considered.

SUMMARY

The present invention has been made in an effort to provide a mobile terminal and a method for controlling the mobile terminal which enable the user to select frames containing a particular object from video contents through a more intuitive user interface and enjoy the selected frames.

In particular, the present invention has been made in an effort to provide a mobile terminal and a method for controlling the mobile terminal recognizing a predetermined object from video contents, generating a progress bar or a scroll bar specific to the recognized object, and selectively providing frames containing an object desired by the user through a simple operation of the object-specific progress bar or scroll bar.

Also, a mobile terminal and a method for controlling the mobile terminal according to one embodiment of the present invention enables the user to edit frames of video contents containing at least one object more easily by using a recognized object from the video contents.

Similarly, a mobile terminal and a method for controlling the mobile terminal according to another embodiment of the present invention enables the user to separate a selected object from its original position and display the separated object at another position.

A mobile terminal according to one aspect of the present invention comprises a touch screen configured to display a first bar for controlling a play screen of video contents and playback of the video contents; and a controller configure to stop playback of the video contents when an input stopping playback of the video contents is received, recognize a particular object included in the play screen when the playback of the video contents is stopped, and display on the touch screen a second bar related to at least one frame including the particular object from among the whole frames of the video contents.

The second bar can include a bar representing a plurality of frames including the particular object grouped and indexed according to the order of playback.

The first bar can include a progress icon indicating a current position within the video contents.

The second bar can include a progress icon indicating a current position of a frame including the particular object within the video contents.

The controller, if receiving an input moving a touch input on a progress icon of the second bar along a predetermined direction, configured to display on the touch screen a frame corresponding to a position of the touch input.

The predetermined direction can correspond to left and right direction along the second bar.

The controller configured to change the position of a progress icon included in the first bar for indicating a current position of a frame within the video contents according as the frame displayed on the touch screen is changed.

The controller, in case a touch input on a progress icon of the second bar is released, is configured to recognize at least one object included in a frame displayed on the touch screen and display a second bar corresponding to the recognized object on the touch screen.

The predetermined input can include a voice command for stopping an input on a stop icon displayed on the first bar or playback of video contents.

The particular object can include at least one from among at least one person, at least one thing, a background included in the video contents, and at least one object included in the background.

The recognized particular object can include at least two or more objects and in case a second bar corresponding to a first object is moved to a second bar corresponding to a second object and thus at least two or more second bars overlap with each other, the controller is configured to display on the touch screen a user interface for generating a third bard corresponding to a new frame set generated by synthesizing the first and second object.

The user interface can include a second frame area including a first frame area including either of the first and the second object, the first object, and the second object; and the controller, if receiving an input moving a second bar corresponding to the first object to either of the first and second frame area, is configured to set up a frame mapped to a third bar differently according to an area at which the second bar is positioned.

In case a second bar corresponding to the first object is positioned in the first frame area, the third bar generated can correspond to a frame including either of the first and second object from among the video contents.

In case a second bar corresponding to the first object is positioned in the second frame area, the third bar generated can correspond to a frame including the first and the second object from among the video contents.

In case a second bar corresponding to the first object enters either of the first and the second frame area, the controller is configured to change display attributes of a frame area in the user interface into which the second bar enters.

The third bar can include identification information for identifying a form synthesizing the first and the second object.

The controller is configured to change display attributes of the first bar in such a way that a frame interval corresponding to the third bar from among the frames corresponding to the first bar is differentiated from other frame intervals.

In case a touch input making the second bar get out of the touch screen is received, a frame including an object corresponding to the second bar can be removed from the video contents.

The controller is configured to display on the touch screen identification information for indicating removal of a frame including an object corresponding to the second bar from the video contents.

A mobile terminal according to another aspect of the present invention comprises a touch screen configured to display a progress bar for controlling a play screen of video contents and playback of the video contents; and a controller configured to, in case playback of the video contents is stopped, recognize at least one object and display on the touch screen a bar generated by indexing at least one frame including the recognized object according to a playback order in conjunction with the at least one object recognized.

The controller, if receiving an input selecting a particular position of the bar, is configured to display on the touch screen a frame corresponding to the particular position from among the grouped frames.

A method for controlling a mobile terminal according to yet another aspect of the present invention comprises displaying on the touch screen a first bar for controlling a play screen of video contents and playback of the video contents; receiving a predetermined input for the touch screen; stopping playback of the video contents in response to the predetermined input; recognizing a particular object included in the screen stopped playback; and displaying on the touch screen a second bar controlling at least one frame including the particular object from among the whole frames of the video contents independently of the video contents.

A mobile terminal according to yet another aspect of the present invention comprises a memory; a display displaying a video; and a controller configured to, if obtaining a selection signal for at least one object included in the video, display the at least one object selected at a changed position from its original position and store the at least one object displayed in the memory.

A camera is further included and the image can correspond to an image obtained through the camera.

The video can correspond to images pre-stored in the memory.

The selection signal can correspond to a touch operation of the user on at least one of the at least one object.

The touch operation can correspond to at least one of a long touch on the at least one object and a drag touch following a contour of the at least one object.

The controller, if obtaining a selection signal for the at least one touch input, is configured to display an area indicator including the at least one object selected.

The controller is configured to display an image duplicating the at least one object selected.

The selection signal corresponds to a selection signal for a plurality of objects and the controller, if obtaining a selection signal for the plurality of objects, is configured to display a change of the plurality of objects according to progress of time.

The controller, if the at least one object selected disappears from the display, is configured to stop displaying the change of the at least one object according to the progress of time.

The controller, if the at least one object disappeared is displayed again on the display, is configured to display again the change of the at least one object according to the progress of time.

A method for controlling a mobile terminal according to still another aspect of the present invention comprises displaying a video containing at least one object; obtaining a selection signal for at least one of the at least one object; displaying a change of the at least one object selected according to the progress of time; and storing the at least one object displayed.

The method for controlling a mobile terminal can further comprise capturing the image by using a camera.

The selection signal can correspond to at least one touch operation between a long touch of the user on at least one of the at least one object and a drag touch following a contour of the at least one object.

If a selection signal for the at least one object is obtained, displaying an area indicator including at least one object selected can be further included.

If the at least one object selected disappears, stopping displaying a change of the at least one object selected according to the progress of time can be further included.

Specifics of other embodiments will be described in detail with reference to appended drawings.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

MODE FOR INVENTION

Figure 1:
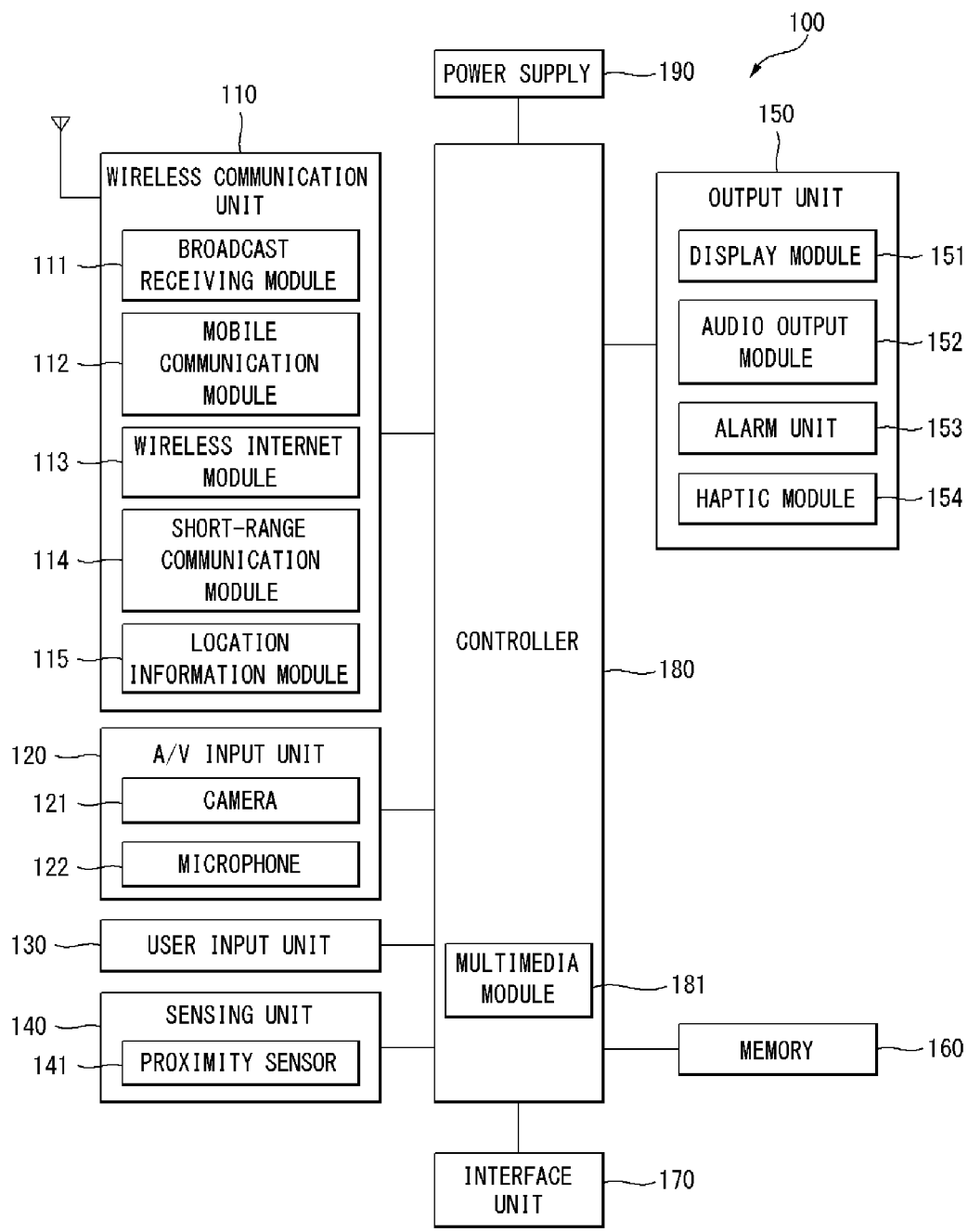
FIG. 1 is a block diagram of a mobile terminal according to one embodiment of the present invention.

FIG. 1 is a block diagram of a mobile terminal 100 according to an embodiment of the present invention.

As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but implementing all of the illustrated components is not a requirement. Greater or fewer components may alternatively be implemented.

In what follows, the constituting elements will be described one after another.

The wireless communication unit 110 generally includes one or more components allowing radio communication between the mobile terminal 100 and a wireless communication system or a network in which the mobile terminal is located. For example, in FIG. 1, the wireless communication unit includes at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel.

Further, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider. The broadcast associated information may also be provided via a mobile communication network and, in this instance, the broadcast associated information may be received by the mobile communication module 112.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 can receive a digital broadcast using a digital broadcast system such as the multimedia broadcasting-terrestrial (DMB-T) system, the digital multimedia broadcasting-satellite (DMB-S) system, the digital video broadcast-handheld (DVB-H) system, the data broadcasting system known as the media forward link only (Media-FLO®), the integrated services digital broadcast-terrestrial (ISDB-T) system, etc.

The broadcast receiving module 111 can also be configured to be suitable for all broadcast systems that provide a broadcast signal as well as the above-mentioned digital broadcast systems.

In addition, the broadcast signals and/or broadcast-associated information received via the broadcast receiving module 111 may be stored in the memory 160.

In addition, the mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal and may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

Also, the location information module 115 is a module for checking or acquiring a location or position of the mobile terminal. The location information module 115 may acquire location information by using a global navigation satellite system (GNSS). Here, the GNSS is a standard generic term for satellite navigation systems revolving around the earth and allowing certain types of radio navigation receivers to transmit reference signals determining their location on or in the vicinity of the surface of the earth. The GNSS may include the United States' global positioning system (GPS), the European Union's Galileo positioning system, the Russian global orbiting navigational satellite system (GLONASS), COMPASS, a compass navigation system, by the People's Republic of China, and the quasi-zenith satellite system (QZSS) by Japan.

An example of GNSS is a GPS (Global Positioning System) module. The GPS module may calculate information related to the distance from one point (entity) to three or more satellites and information related to time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module may also continuously calculate the current location in real time and also calculate speed information by using the continuously calculated current location.

With reference to FIG. 1, the A/V input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

Further, the image frames processed by the camera 121 may be stored in the memory 160 or transmitted via the wireless communication unit 110. Two or more cameras 121 may also be provided according to the configuration of the mobile terminal.

In addition, the microphone 122 can receive sounds via a microphone in a phone call mode, a recording mode, a voice recognition mode, and the like, and can process such sounds into audio data. The processed audio data may then be converted for output into a format transmittable to a mobile communication base station via the mobile communication module 112 for the phone call mode. The microphone 122 may also implement various types of noise canceling (or suppression) algorithms to cancel or suppress noise or interference generated when receiving and transmitting audio signals.

Also, the user input unit 130 can generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted), a jog wheel, a jog switch, and the like.

Further, the sensing unit 140 detects a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. In FIG. 1, the sensing unit 140 also includes a proximity sensor 141.

In addition, the output unit 150 is configured to provide outputs in a visual, audible, and/or tactile manner. In the example in FIG. 1, the output unit 150 includes the display unit 151, an audio output module 152, an alarm unit 153, a haptic module 154, and the like. In more detail, the display unit 151 can display information processed in the mobile terminal 100. For example, when the mobile terminal 100 is in a phone call mode, the display unit 151 can display a User Interface (UI) or a Graphic User Interface (GUI) associated with a call or other communication.

The display unit 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may also be configured to be transparent or light-transmissive to allow for viewing of the exterior, which is called transparent displays.

An example transparent display is a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

Further, the mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 can function as both an input device and an output device. The touch sensor may have a form of a touch film, a touch sheet, a touch pad, and the like.

Further, the touch sensor may be configured to convert pressure applied to a particular portion of the display unit 151 or a change in the capacitance or the like generated at a particular portion of the display unit 151 into an electrical input signal. The touch sensor may also be configured to detect the pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 can recognize which portion of the display unit 151 has been touched.

With reference to FIG. 1, the proximity sensor 141 may be disposed within or near the touch screen. in more detail, the proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and can be utilized for various purposes.

Examples of the proximity sensor 141 include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like. When the touch screen is the capacitance type, proximity of the pointer is detected by a change in electric field according to the proximity of the pointer. In this instance, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. Further, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be output to the touch screen.

Further, the audio output module 152 can convert and output as sound audio data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function performed by the mobile terminal 100 (e.g., a call signal reception sound, a message reception sound, etc.). The audio output module 152 may also include a speaker, a buzzer, or the like. In addition, the audio output module 152 may output a sound through an earphone jack.

In addition, the alarm unit 153 can output information about the occurrence of an event of the mobile terminal 100. Typical events include call reception, message reception, key signal inputs, a touch input etc. In addition to audio or video signal outputs, the alarm unit 153 can provide outputs in a different manner to inform about the occurrence of an event. For example, the alarm unit 153 can provide an output in the form of vibrations. The video signal or the audio signal may be also output through the display unit 151 or the audio output module 152.

In addition, the haptic module 154 generates various tactile effects the user may feel. One example of the tactile effects generated by the haptic module 154 is vibration. The strength and pattern of the haptic module 154 can also be controlled. For example, different vibrations may be combined to be output or sequentially output.

Besides vibration, the haptic module 154 can generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

Further, the memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

Also, the interface unit 170 serves as an interface with external devices connected with the mobile terminal 100. For example, the external devices can transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device can be connected with the mobile terminal 100 via a port.

When the mobile terminal 100 is connected with an external cradle, the interface unit 170 can also serve as a passage to allow power from the cradle to be supplied therethrough to the mobile terminal 100 or serve as a passage to allow various command signals input by the user from the cradle to be transferred to the mobile terminal therethrough. Various command signals or power input from the cradle may operate as signals for recognizing that the mobile terminal is properly mounted on the cradle.

In addition, the controller 180 controls the general operations of the mobile terminal. For example, the controller 180 performs controlling and processing associated with voice calls, data communications, video calls, and the like. In the example in FIG. 1, the controller 180 also includes a multimedia module 181 for reproducing multimedia data. The multimedia module 181 may be configured within the controller 180 or may be configured to be separated from the controller 180. The controller 180 can also perform a pattern recognition processing to recognize a handwriting input or a picture drawing input performed on the touch screen as characters or images, respectively.

Also, the power supply unit 190 receives external power or internal power and supplies appropriate power required for operating respective elements and components under the control of the controller 180. Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

In what follows, embodiments of the present invention will be described.

For the convenience of description, it is assumed that the display unit 151 is a touchscreen. As described above, the touchscreen 151 can execute both of an information display function and an information input function. However, the present invention is not limited thereto. Also, a touch input mentioned in this document includes contact touch and proximity touch.

Meanwhile, according to an embodiment of the present invention, an user interface for editing video clips can be provided. The user interface can be provided by a video editing software application installed in a computer system capable of watching, editing, or processing a video clip as the user upload the video clip through a user interface. A video clip can include a video file stored in a computer system in which a video editing software application is installed or a video file stored in a predetermined storage device connected to be operated in the computer system. Also, the video file can include the whole or part of the video file.

Figure 2A:
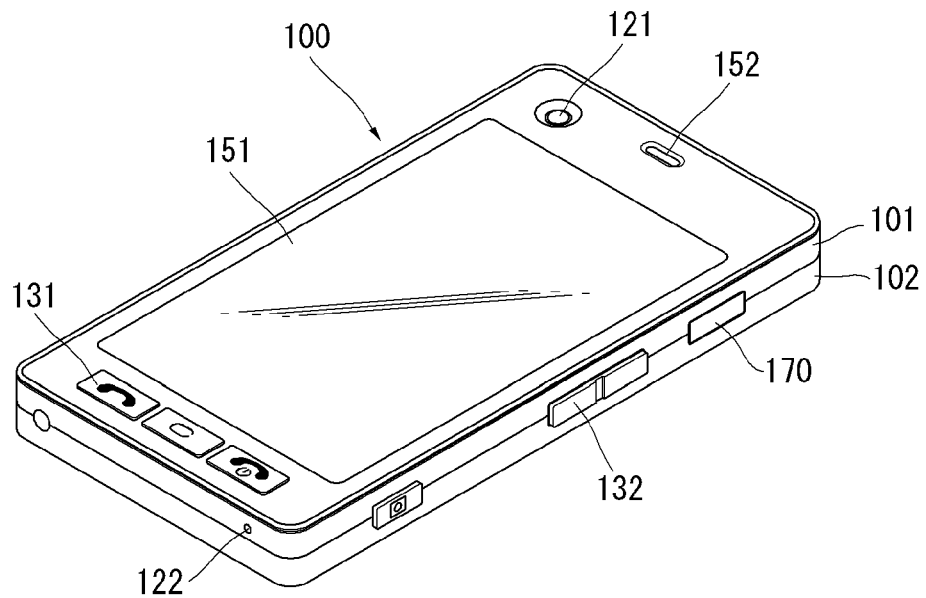
FIG. 2a is a front perspective view of a mobile terminal according to one embodiment of the present invention.

FIG. 2A is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 2B:
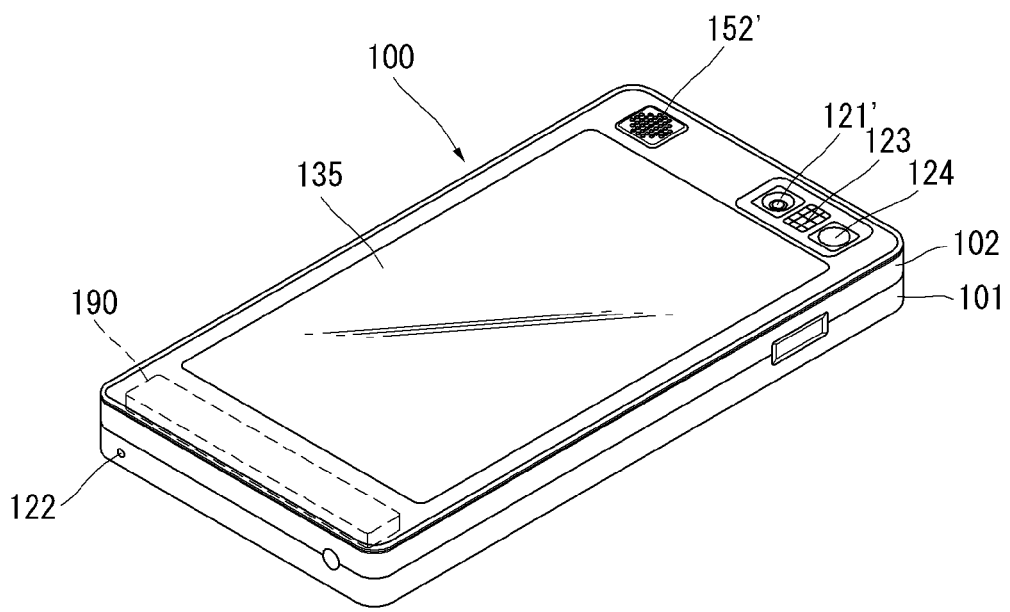
FIG. 2b is a rear perspective view of a mobile terminal according to one embodiment of the present invention.

FIG. 2B is a rear perspective view of the handheld terminal shown in FIG. 2A according to an embodiment of the present invention.

Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Figure 3:
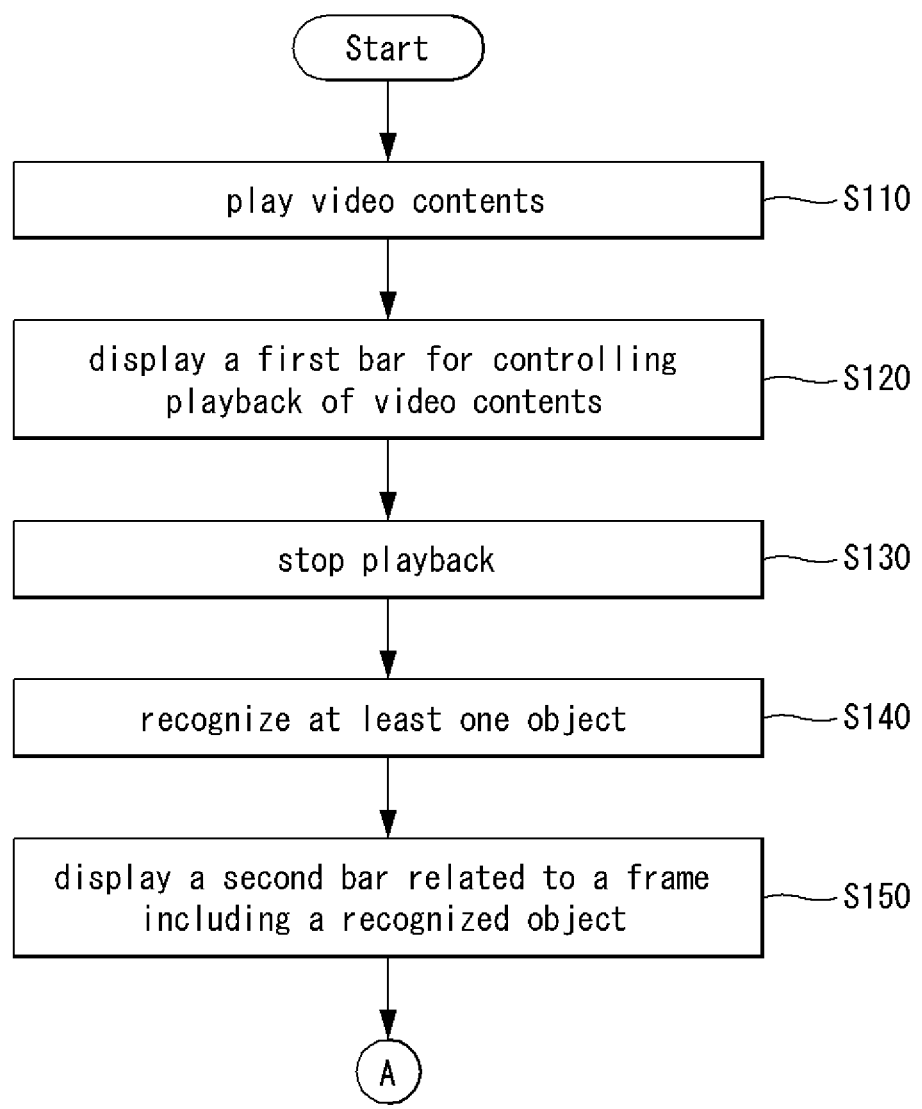
FIG. 3 is a flow diagram of a method for controlling a mobile terminal according to a first embodiment of the present invention.
Figure 4:
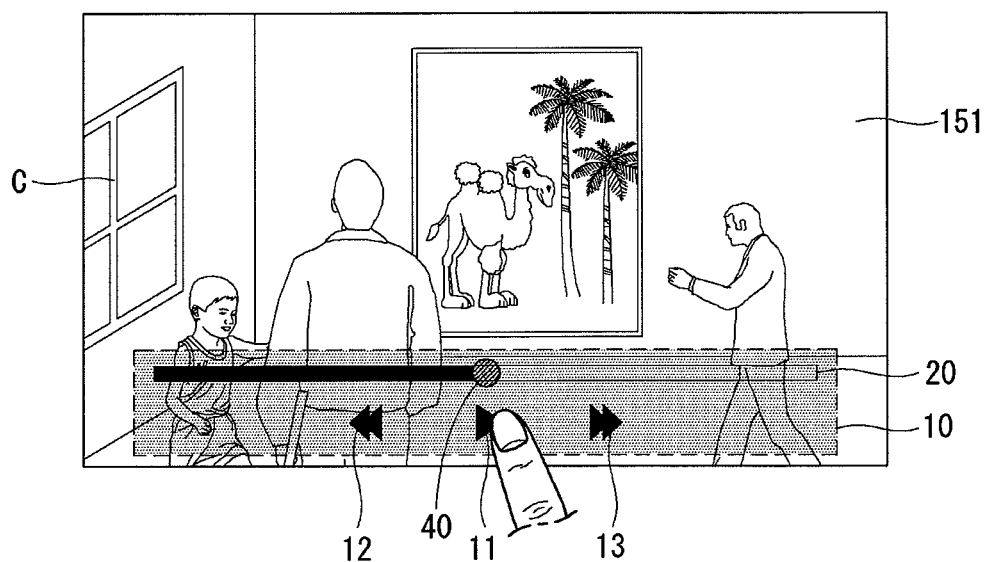
FIGS. 4 to 6 illustrate a method for controlling a mobile terminal according to a first embodiment of the present invention.
Figure 5:
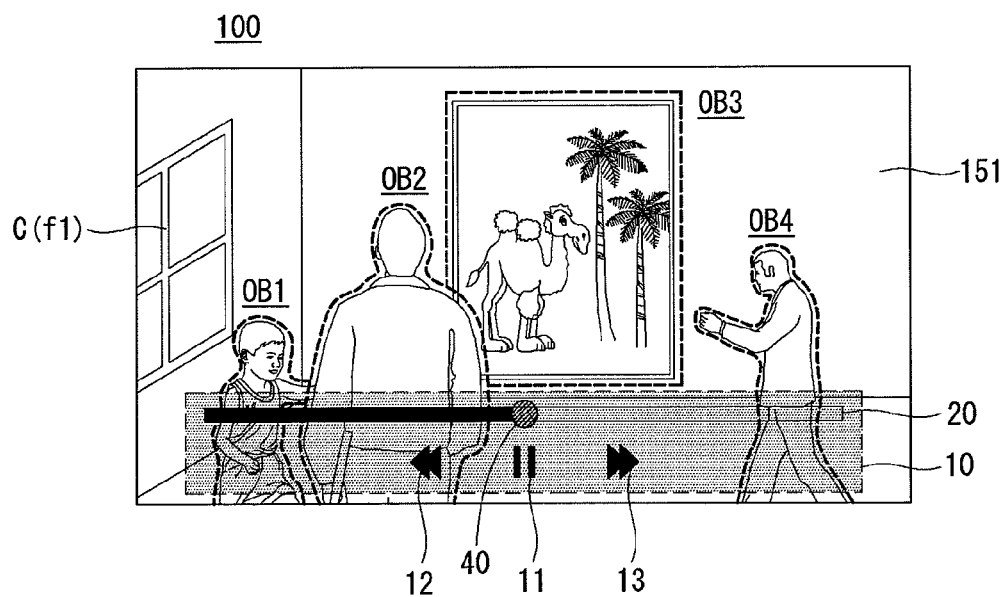
Figure 6:
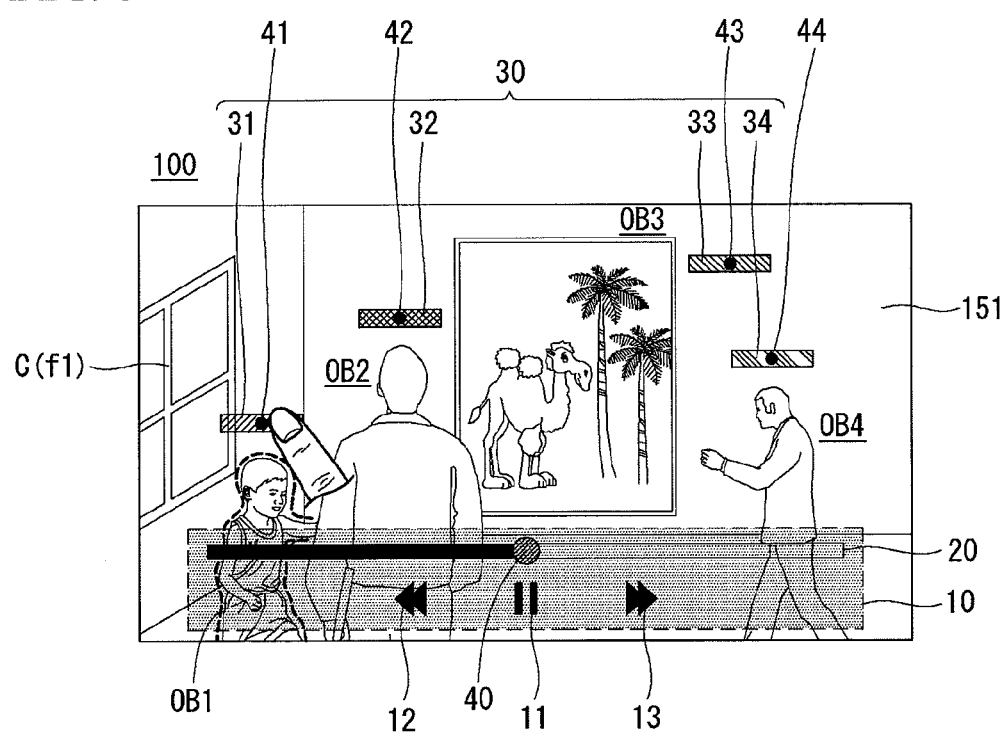

FIG. 3 is a flow diagram of a method for controlling a mobile terminal according to a first embodiment of the present invention; and FIGS. 4 to 6 illustrate a method for controlling a mobile terminal according to a first embodiment of the present invention. The control method can be implemented under the control of the controller 180 of the mobile terminal 100 described with reference to FIG. 1.

With reference to FIG. 3, the controller 180 of the mobile terminal 100 is configured to play video contents S110.

The video contents can include a file stored in the memory 160 of the mobile terminal 100 or an image file provided from an external server through streaming.

The video contents can be provided in various forms. For example, the video contents can be provided in the form of MPEG (Moving Picture Expert Group), MOCV (Quic Time Movie), RealVideo, Avi, and so on.

The video contents include video contents such as a movie, drama, and the like and music contents where simple music contents are displayed together with images.

If the video contents are played, the controller 180 can display on the touch screen 151 a playback screen of the video contents.

Meanwhile, the controller 180 is configured to display a first bar for controlling playback of video contents on a play screen of the video contents S120.

The first bar is a graphic user interface (GUI) intended for controlling playback of video contents and can be realized in the form of a bar. Since the first bar has a function providing location information about video contents currently playing, it is called a progress bar.

In other words, the progress bar provides the user with position information of a time point where the contents are currently played among the whole time points of the contents played by a playback command of the user. The position information is displayed and provided to the user in such a way that it can be differentiated from other part of the progress bar. For example, a playing header is positioned at a current playback point and current playback position information of the video contents can be identified according to a relative position of the playing header among the whole interval of the progress bar.

Meanwhile, the progress bar can include at least one soft button corresponding respectively to at least one function such as playback, pause, fast forward, fast rewind, and the like of the video contents. The mobile terminal 100 can control playback of the video contents through an input on the at least one soft button.

Meanwhile, the mobile terminal 100, if a touch input on the touch screen 151 is received while a play screen of the video contents is displayed on the touch screen 151, can display the progress bar in one area of the touch screen 151.

In case a predetermined input is received for a predetermined area of the touch screen 151 where a play screen of video contents is received, the controller 180 is configured to stop playing the video contents S130.

For example, the predetermined area can include a pause button included in a progress bar. In an input about the pause button is received, the controller 180 is configured to display the screen (which can also be called a frame) stopped playback of contents on the touch screen 151.

The controller 180 is configured to recognize at least one object included in the screen while playback of the video contents is stopped S140.

Here, an input for stopping playback of the video contents can include a long touch input about the pause button included in the progress bar. As a long touch input about the button is received, the controller 180 is configured to enter an object recognition mode meant for recognizing at least one object included in a frame currently played.

Meanwhile, if an input for simply choosing a pause button included in the progress bar, the controller 180 is configured to control in such a way that only the operation stopping video contents currently played is carried out.

The video contents can include at least one object. The object can include at least one from among a person, a thing other than human, a background included in the video contents, and at least one object included in the background. Meanwhile, while play of the video contents is stopped, an object to be recognized can be set up beforehand.

For example, when video contents are generated, information about at least one particular object can be included. In case the object is a person, the information about the particular object stores reference object (person) information for recognizing a person appearing in the video contents in a database and determines whether an object (person) recognized from the screen stopped playback of the video contents is the same as the object (person) information stored in the database. Then, if the same object (person) information is found, the object (person) recognition result is informed to the user.

The controller 180 is configured to display a second bar related to a frame including the recognized object from the video contents on the touch screen 151 based on the object recognized from the screen stopped playing 5150.

Here, the second bar is in the form of a bar and can include a status bar or a scroll bar indexing a group of frames including the recognized object among the frames of the video contents.

Also, the second bar is in the form of a progress bar and if a touch and drag input is received along a predetermined direction with respect to the progress bar, the controller is configured to display on the touch screen 151 a frame corresponding to a particular point on the progress bar recognized by the touch and drag input. The frame can be displayed on the front of the touch screen 151.

In other words, a particular point of the second bar is related to one frame including the particular object. Therefore, a first particular point of the second bar is related to a first frame including the particular object and a second particular object of the second bar is related to the particular object and an N-th particular point of the second bar is related to an N-th frame including the particular object.

In what follows, with reference to FIGS. 4 to 6, a procedure of recognizing at least one object included in the video contents when video contents being played is temporarily stopped and displaying a second bar related to the recognized object on the touch screen 151 will be described in more detail.

FIG. 4 is an example of video contents play screen illustrating S110 to S120 of FIG. 3.

With reference to FIG. 4, the controller 180 is configured to display a play screen C of video contents on the touch screen 151. In case a predetermined input (for example, a touch input for the play screen) is received from the play screen C of the video contents, the controller 180 is configured to display a first bar 20 for controlling playback of the video contents on one area of the play screen C of the video contents. Here, for the convenience of description, the first bar is called a first progressive bar.

The first progressive bar 20 can include a progressive icon 40 indicating to which position of the whole frames a current frame of the video contents corresponds.

The controller 180, by including a play button 11, a fast rewind (FR) button 12, a fast forward (FF) button 13 of the contents in addition to the first progressive bar 20, is configured to display an additional control area 10 for controlling playback of the video contents on the touch screen 151.

With reference to FIG. 5, in case an input of making a long touch on the play button 11 on the control area 10, the controller 180 is temporarily configured to stop video contents currently playing and the frame C (f1) of the stopped video contents is displayed on the touch screen 151.

The controller 180 is configured to carry out an object recognition operation immediately as the long touch input is received. Also, the controller 180 is temporarily configured to stop the video contents by selecting the play button 11 and if a long touch input for the touch screen 151 displaying the video contents or a progress bar for controlling playback of the video contents is received, the controller 180 is configured to carry out the object recognition operation.

The controller 180 is configured to recognize at least one object OB1, OB2, OB3, OB4 from the frame C (f1) of the video contents. The controller 180 is configured to apply at least one object recognition algorithm for recognizing the object OB1, OB2, OB3, OB4 and the mobile terminal 100 can use an algorithm for recognizing a predetermined object from a still image known to the public; therefore, detailed descriptions of the object recognition will be omitted.

The controller 180, by recognizing an object (OB1, OB2, OB3, OB4) from a stopped frame C (f1) by using the object recognition algorithm known to the public and outlining the object (OB1, OB2, OB3, OB4) with a dotted line, is configured to control display of the stopped frame of the video contents to allow identification of the recognized object.

With reference to FIG. 6, the controller 180 is configured to display a second bar 30 related to the recognized object OB1, OB2, OB3, OB4 on the touch screen 151. As described above, the second bar provides a function of a progress bar and at the same time, provides a function as a status bar formed by grouping a plurality of frames including a particular object and indexing them according to the order of playback. For the convenience of description, the second bar can be called an object progress bar.

Meanwhile, the controller 180 is configured to display identification information (for example, including text and image information) of a recognized object for identification of the recognized object.

The identification information of the recognized object can be obtained through meta data of video contents stored in the memory (160 of FIG. 1) of the mobile terminal.

When a particular object is recognized, the Internet or an external server is searched for the identification information of the recognized object and the identification information of the recognized object is displayed on the touch screen 151.

Meanwhile, the controller 180 is configured to receive a voice command including identification information of the recognized object and carries out a control operation according to the voice command. For example, the voice command can include a command commanding synthesizing a first and a second object from among the recognized objects, a command commanding deleting a frame including a particular object from the whole video contents.

To continue the description, referring to FIG. 6, the controller 180 is configured to display an object progress bar 31, 32, 33, 34 corresponding to each object OB1, OB2, OB3, OB4 respectively around the object OB1, OB2, OB3, OB4. For example, the controller 180 is configured to display a first object progress bar 31 corresponding to the frames including the recognized first object OB1 at the top of the first object OB1. The controller 180 is configured to display a second object progress bar 32 corresponding to the frames including the recognized second object OB2 at the top of the second object OB2; a third object progress bar 33 corresponding to the frames including the recognized third object OB3 at the top of the third object OB3; and a fourth object progress bar 34 corresponding to the frames including the recognized fourth object OB4 at the top of the fourth object OB4.

Meanwhile, the object progress bar 31, 32, 33, 34 corresponding to a particular object OB1, OB2, OB3, OB4 can include a progress icon 41, 42, 43, 44 indicating a relative position of a frame displayed on the current touch screen 151 from among the whole frames including the particular object OB1, OB2, OB3, OB4.

For example, the first object progress bar 31 can include a progress icon 41 indicating a position of a frame displayed on the current touch screen 151 from among the whole frames including the first object OB1. This applies the same to the second to the fourth object progress bar 32, 33, 34.

As described above, the controller 180 of the mobile terminal 100 is configured to extract frames including a particular object from video contents and display on the touch screen the corresponding frames being indexed at an object progress bar in the form of a bar. And the controller 180 is configured to control display of the frames including the particular object independently of the whole video contents through manipulation of the user against the object progress bar.

Figure 7:
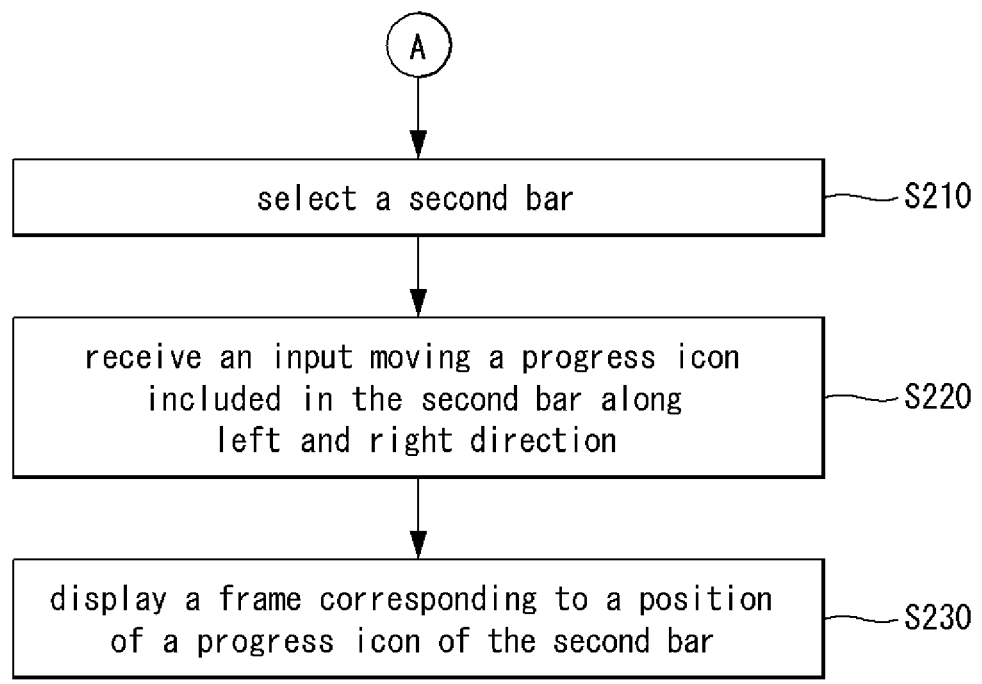
FIG. 7 is a flow diagram of a method for controlling a mobile terminal according to a second embodiment of the present invention.

FIG. 7 is a flow diagram of a method for controlling a mobile terminal according to a second embodiment of the present invention; FIGS. 8 to 11 illustrate a method for controlling a mobile terminal according to a second embodiment of the present invention.

With reference to FIG. 7, the controller 180 of the first embodiment described above is configured to receive an input commanding selection of an object progress bar (a second bar) displayed on the touch screen 151, 5210.

And the controller 180 is configured to receive an input moving a progress icon included in the object progress bar in the left and right direction 5220.

Figure 8:
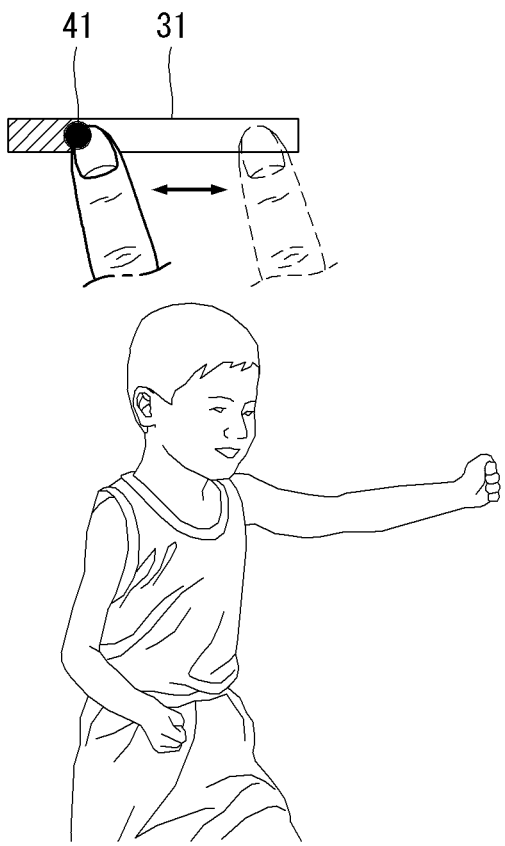
FIGS. 8 to 11 illustrate a method for controlling a mobile terminal according to a second embodiment of the present invention.

For example, with reference to FIG. 8, the controller 180 is configured to receive a touch input moving a progress icon 41 in the left and right direction with respect to the first object progress bar 31. The controller 180, if receiving a long touch input on the first object progress bar 31, is configured to magnify and display the first object progress bar. Accordingly, the user can move a progress icon 41 while scrubbing it with respect to the magnified first object progress bar 31.

In response to the scrubbing input, the controller 180 is configured to searches the whole video contents frames for those frames including the corresponding object and display a search result on the touch screen 151. In other words, the controller 180 is configured to display on the touch screen 151 a frame corresponding to the position of a progress icon of the progress bar (second bar) 5230.

Figure 9:
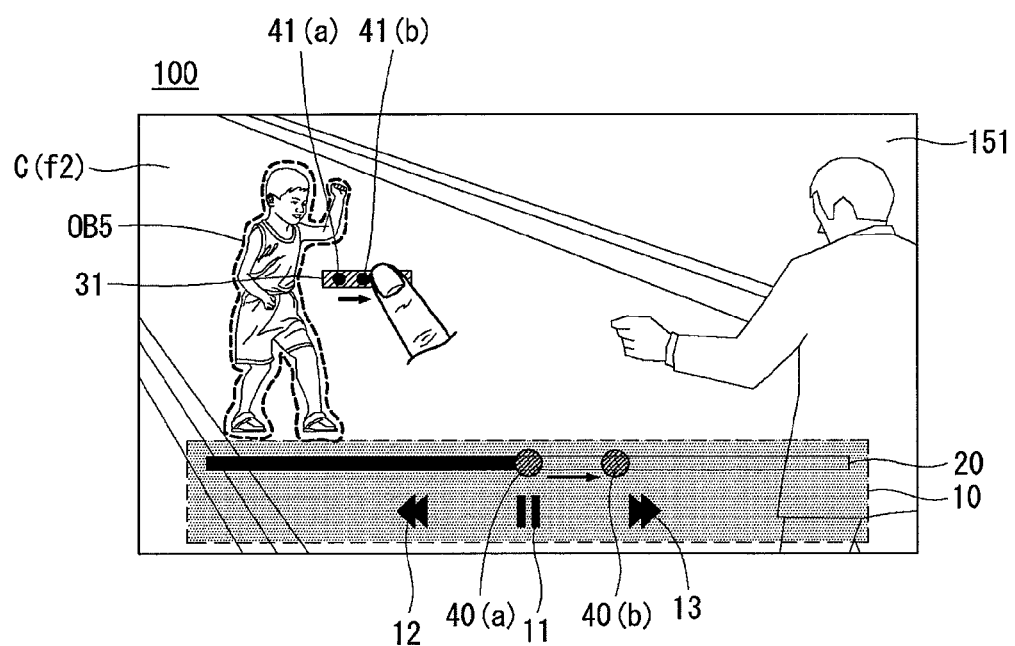

With reference to FIG. 9, in case a touch input moving the position of a progress icon of the first object progress bar 31 from 41(*a*) to 41(*b*), the controller 180 is configured to change a frame (C (f1) of FIG. 5) corresponding to the position 41(*a*) to a frame corresponding to the position 41(*b*) (C (f2) of FIG. 9) and display the changed frame on the touch screen 151.

Meanwhile, the first object progress bar 31 can be associated with a progress bar 20 controlling playback of the whole video contents. In other words, as described above, if the position of a progress icon 41(*a*), 41(*b*) included in the first object progress bar 31 is changed, the changed position is reflected in the progress bar 20 and thus the position of a progress icon included in the progress bar 20 is moved from 40(*a*) to 40(*b*). The position 41(*a*) of the progress icon of the first object progress bar 31 corresponds to the position 40(*a*) of a progress icon of the progress bar 20 while the position 41(*b*) of a progress icon of the first object progress bar 31 corresponds to the position 40(*b*) of a progress icon of the progress bar 20.

The embodiment described with reference to FIGS. 6 to 9 provides an example where, if an input selecting and scrubbing an object progress bar is received along a predetermined direction, the frame corresponding to the position of the scrubbing input is displayed on the front of the touch screen 151.

However, examples of displaying a frame corresponding to a scrubbing input on an object progress bar are not limited to the method described above.

Figure 10:
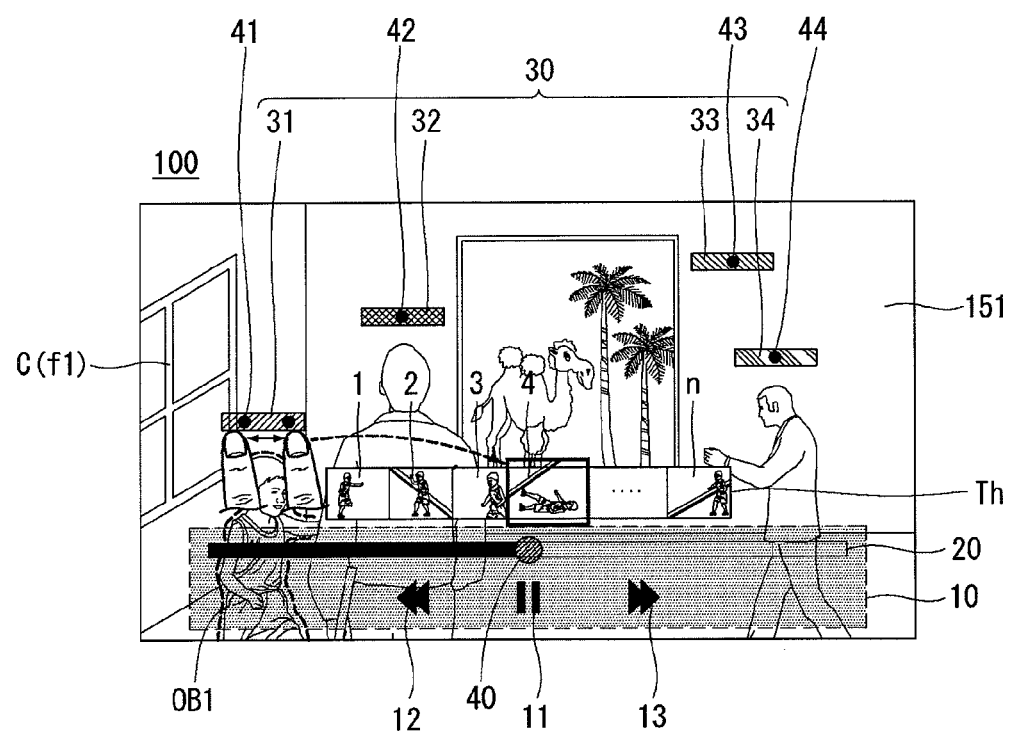

However, with reference to FIG. 10, in case an input scrubbing a progress icon 41 of the first object progress bar 31 along a predetermined direction, the controller 180 is configured to display at least one frame including the first object OB1 from among the whole frames of the video contents in the form of a thumbnail image Th (1, 2, 3, 4, . . . , n).

The controller 180 is configured to display at the top of the progress bar 20 the thumbnail image Th corresponding to the frame including the first object OB1.

The controller 180, each time a particular part of the first object progress bar 31 is scrubbed, is configured to display a thumbnail image corresponding to the particular part by highlighting the thumbnail image. For example, with reference to FIG. 10, the controller 180 is configured to indicate a currently selected frame by emphasizing a thumbnail image 4 corresponding to the position 41 of the progress icon.

The controller 180 controls a frame including the particular object independently of the whole video contents in response to the user's manipulation of an object progress bar corresponding to the particular object. When control of the object progress bar is completed, the controller 180 recognizes an object included in a new frame and generates a recognized object progress bar and displays the recognized object progress bar on the touch screen 151.

Figure 11:
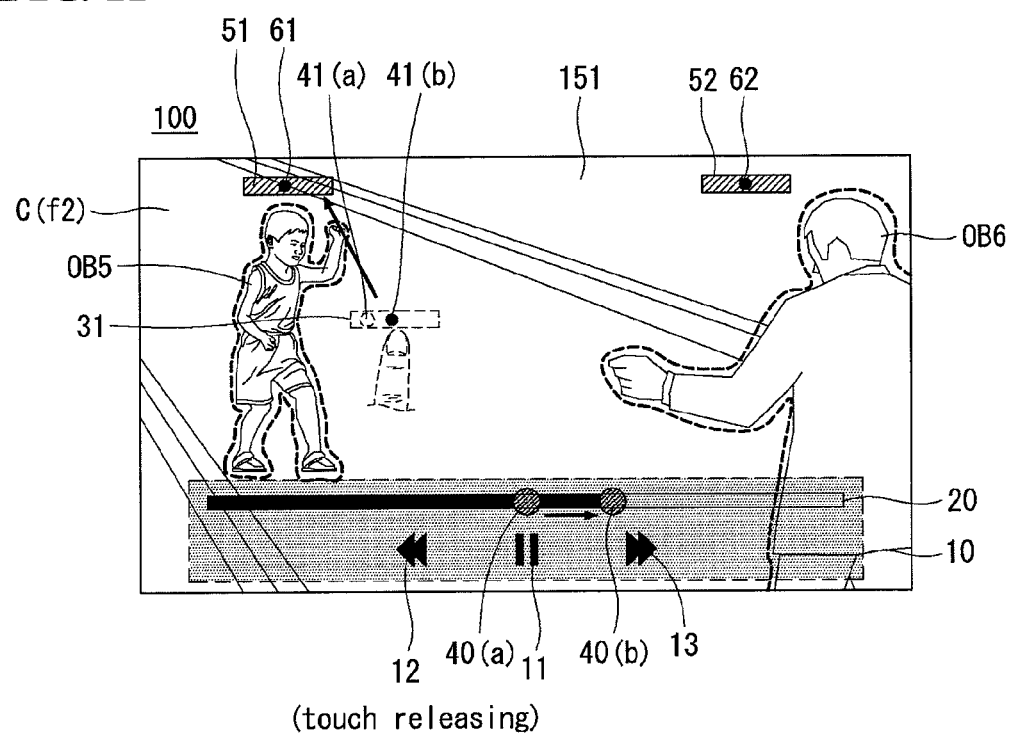

For example, with reference to FIG. 11, if a touch input moving a progress icon 41 of the first object progress bar 31 corresponding to the first object OB1 of FIG. 9 from a first position 41(*a*) to a second position 41(*b*) is received and then the touch input is released, an operation of recognizing at least one object included in the screen corresponding to the second position 41(*b*) can be carried out.

In other words, the frame C (f2) displayed on the touch screen 151 of FIG. 9 corresponds to the frame including the first object OB1 on the touch screen 151 through manipulation of the first object progress bar 31 corresponding to the first object OB1 while only the first object OB1 is recognized.

With reference to FIG. 11, however, a sixth object OB6 in addition to the fifth object OB5 displayed on the screen of FIG. 11 is assumed to be a recognizable object.

Therefore, in case the position of a touch input on the first object progress bar 31 corresponding to the fifth object OB5 in the first frame (C (f1) of FIG. 6) moves from a first position (41(*a*) of FIG. 11) to a second position (41(*b*) of FIG. 11), the second frame (C (f2) of FIG. 11) from among the frames including the fifth object OB5 can be displayed on the touch screen 151. And in case a touch input on the second position 41(*b*) is released from the second frame (C (f2) of FIG. 11), the controller 180 is configured to carries out a new object recognition operation for the second frame C (f2).

As the object recognition operation is carried out, the fifth OB5 and the sixth object OB6 can be recognized. Then the controller 180 is configured to display a fifth 51 and a sixth object progress bar 52 corresponding respectively to the fifth OB5 and the sixth object OB6 at the top of the respective objects.

As described above, each object progress bar 51, 52 can include a progress icon 61, 62 for indicating a current position of the corresponding frame.

Next, as described above, according to the user's manipulation on the fifth 51 or the sixth object progress bar 61, display of the frames included the respective objects can be controlled.

In the above, the first and second embodiment illustrate an example where, if the currently playing video contents is temporarily paused during playback, at least one object included in the temporarily stopped frame; the frame including a recognized object is extracted; an object progress bar being indexed for the extracted frame is displayed; and only those frames including the recognized object from among the whole frames of the video contents are displayed on the screen through the object progress bar.

In what follows, through FIGS. 12 to 16, an example of editing frames of video contents through an object progress bar described above will be described.

Figure 12:
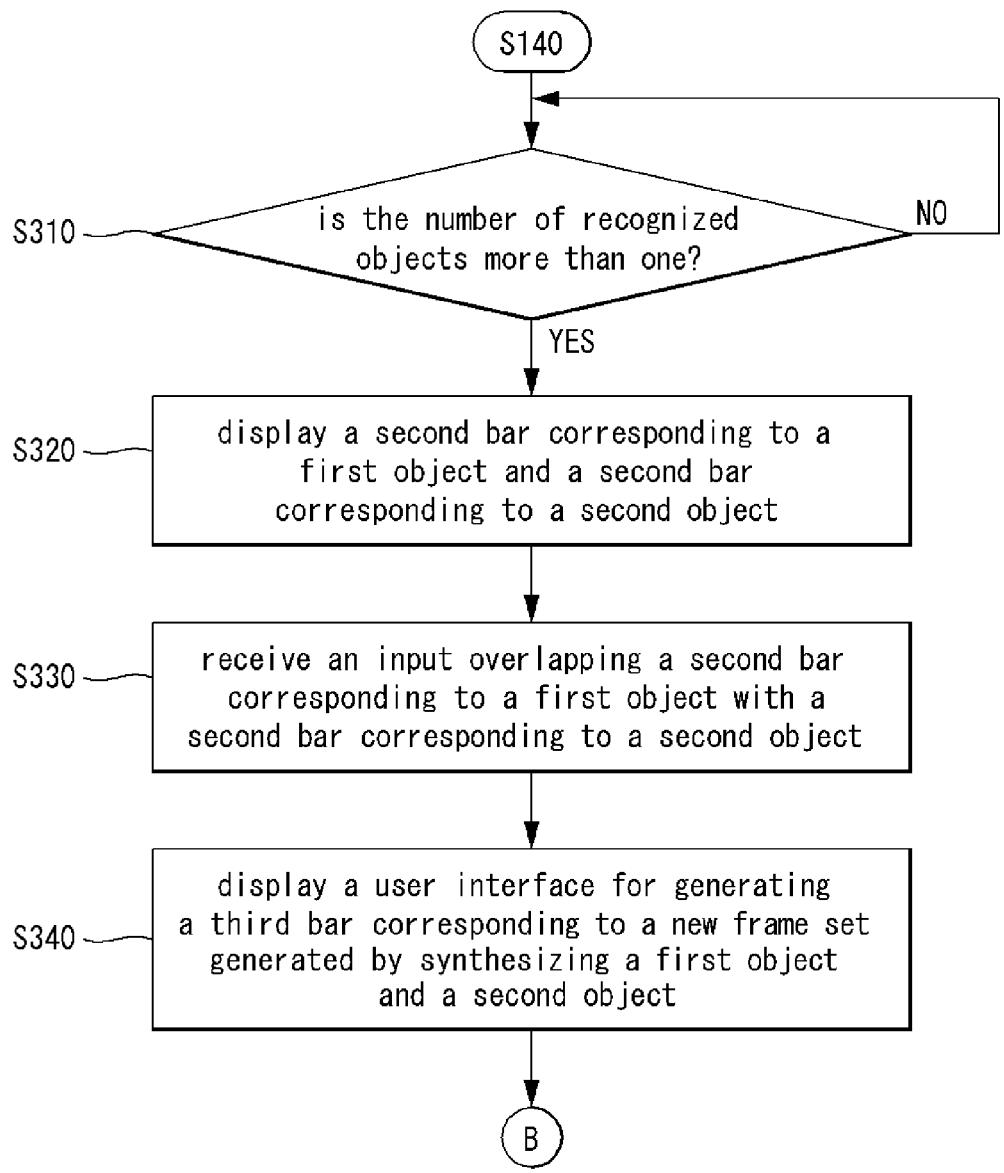
FIG. 12 is a flow diagram of a method for controlling a mobile terminal according to a third embodiment of the present invention.
Figure 13:
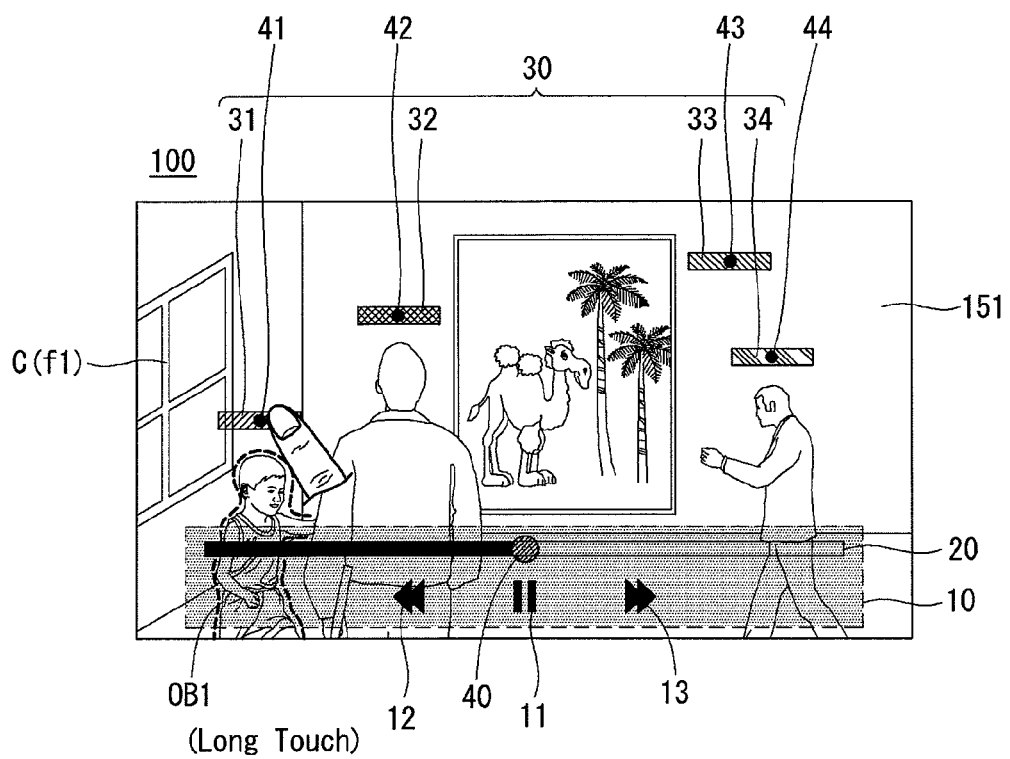
FIGS. 13 to 15 illustrate a method for controlling a mobile terminal according to a third embodiment of the present invention.
Figure 14:
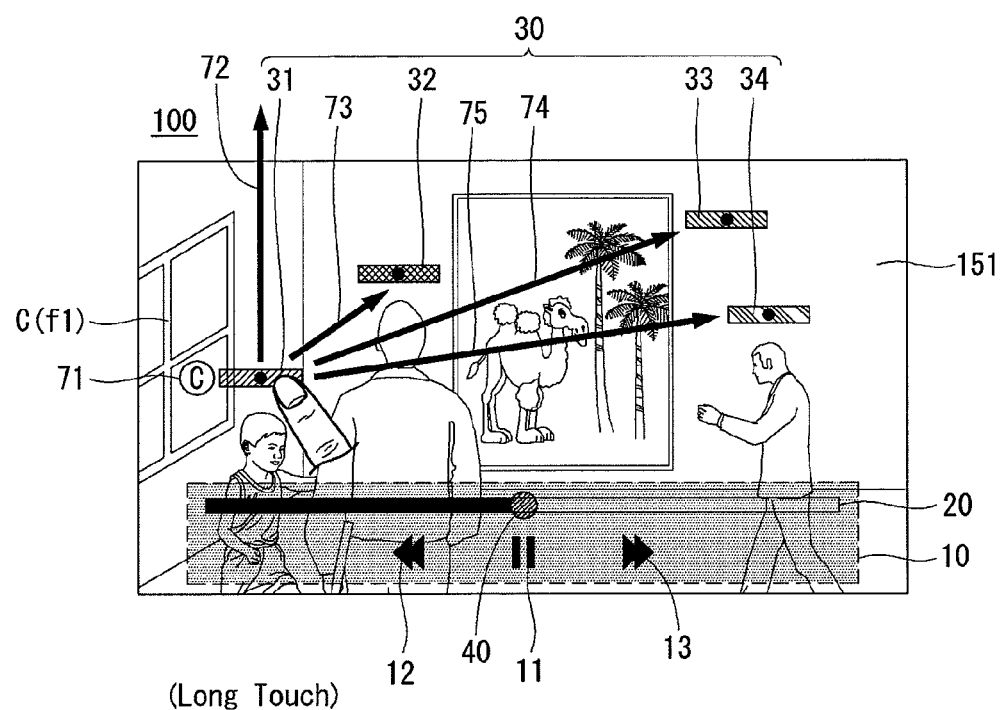
Figure 15:
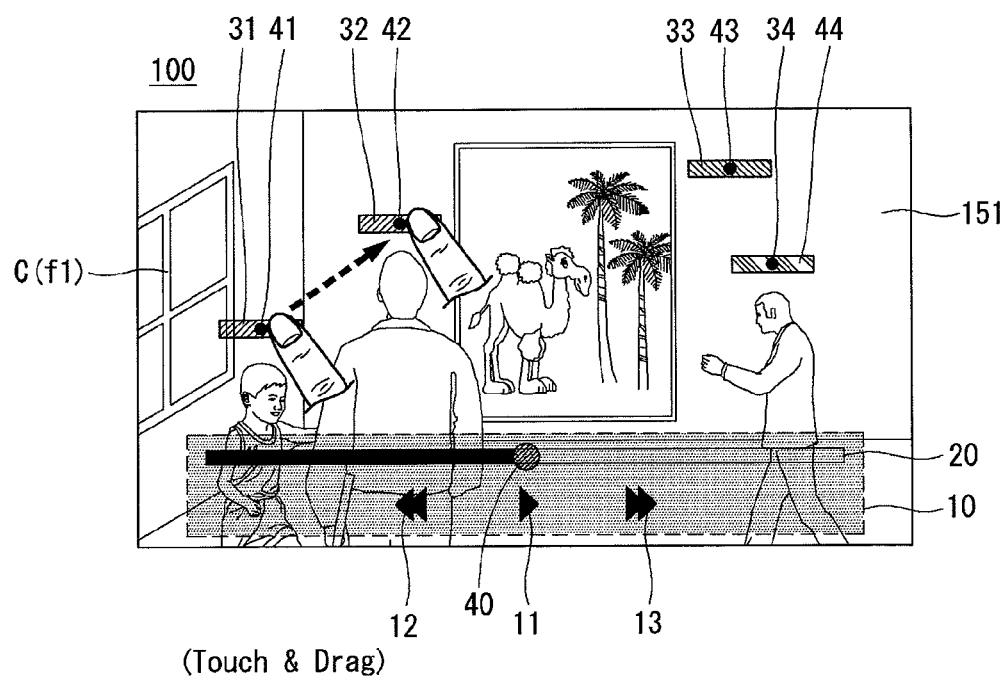

FIG. 12 is a flow diagram of a method for controlling a mobile terminal according to a third embodiment of the present invention; FIGS. 13 to 15 illustrate a method for controlling a mobile terminal according to a third embodiment of the present invention.

With reference to FIG. 12, the controller 180 of the mobile terminal 100 is configured to recognize at least one object in the screen stopped playback S140. Then the controller 180 is configured to determine whether the number of objects recognized is at least two or more S310.

The controller 180 is configured to receive a touch input overlapping the first object progress bar with the second object progress bar S330. The touch input can include an input which selects the first object progress bar and drags it into a second object progress bar, making the two object progress bars overlapped with each other.

Then the controller 180 is configured to display on the touch screen 151 a user interface for generating a third bar capable of independently controlling a new frame set generated by synthesizing the first and the second object.

In this document, a first bar, a second bar, and a third bar are a status bar having different attributes from each other. In other words, the first bar can be defined to be a progress bar intended for controlling playback of the whole video contents; the second bar can be defined to be an object progress bar corresponding to one object; and the third bar is defined to be an object progress bar corresponding to a frame generated from synthesis of at least two or more objects.

With reference to FIG. 13, in case a long touch input or double touch input about a first object progress bar 31 is received, the controller 180 is configured to enter an edition mode of an object progress.

With reference to FIG. 14, in response to the long touch input, a first object progress bar 31 corresponding to a first object progress bar 31 can move to another object progress bar 32, 33, 34 or guide information 71, 72, 73, 74, 75 informing of availability of the first object progress bar 31 outside the touch screen 151.

The guide can be implemented in the form of an arrow 71, 72, 73, 74, 75 representing a movable path of the first object progress bar 31.

With reference to FIG. 15, the first object progress bar 31 can be moves to the second object progress bar, making them overlapped with each other. Due to the overlapping, the first and the second object are synthesized; a user interface for generating a third bar corresponding to the frame including the first object and/or the second object will be described in detail below.

Figure 16:
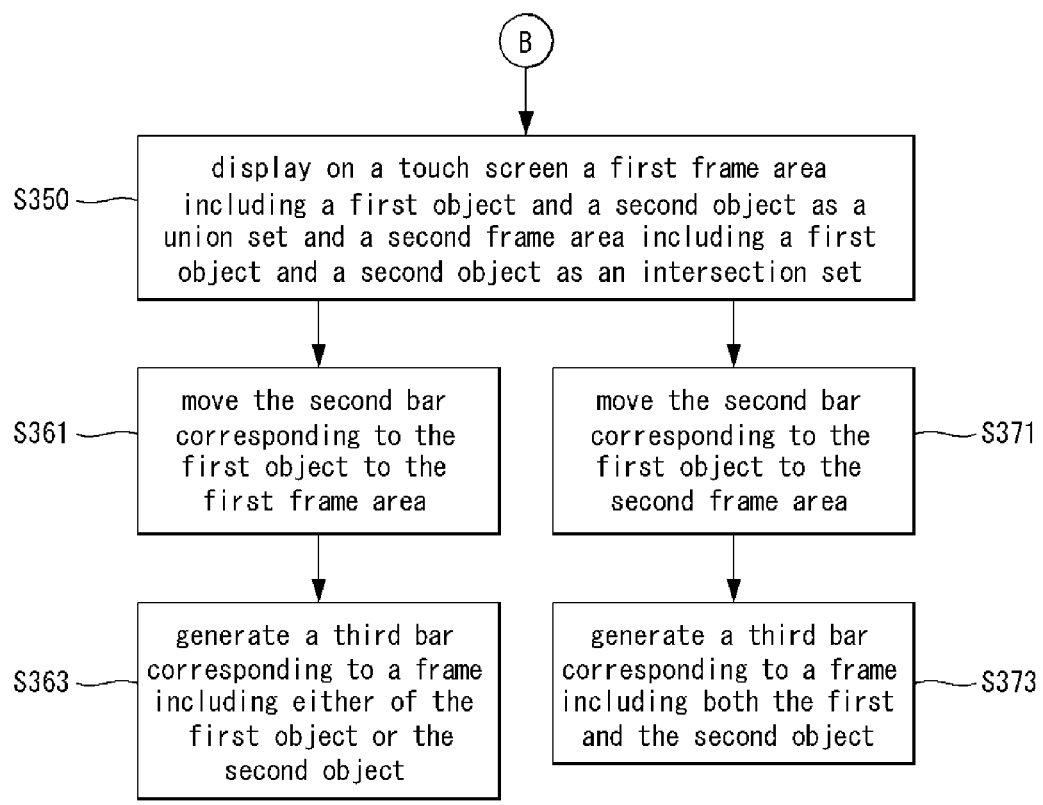
FIG. 16 is a flow diagram illustrating more specifically a method for controlling a mobile terminal according to a third embodiment of the present invention.

FIG. 16 is a flow diagram illustrating more specifically a method for controlling a mobile terminal according to a third embodiment of the present invention; FIGS. 17 to 21 illustrate a method for controlling a mobile terminal according to a third embodiment of the present invention.

With reference to FIG. 16, the controller 180 is configured to display on the touch screen 151 a first frame area including a first object and a second object as a union and a second frame area including the first object and the second object as an intersection S350.

The first frame area refers to a frame area including either of the first object or second object among the whole frames of the video contents.

Also, the second frame area refers to a frame area including both of the first and the second object among the whole frames of the video contents.

Figure 17:
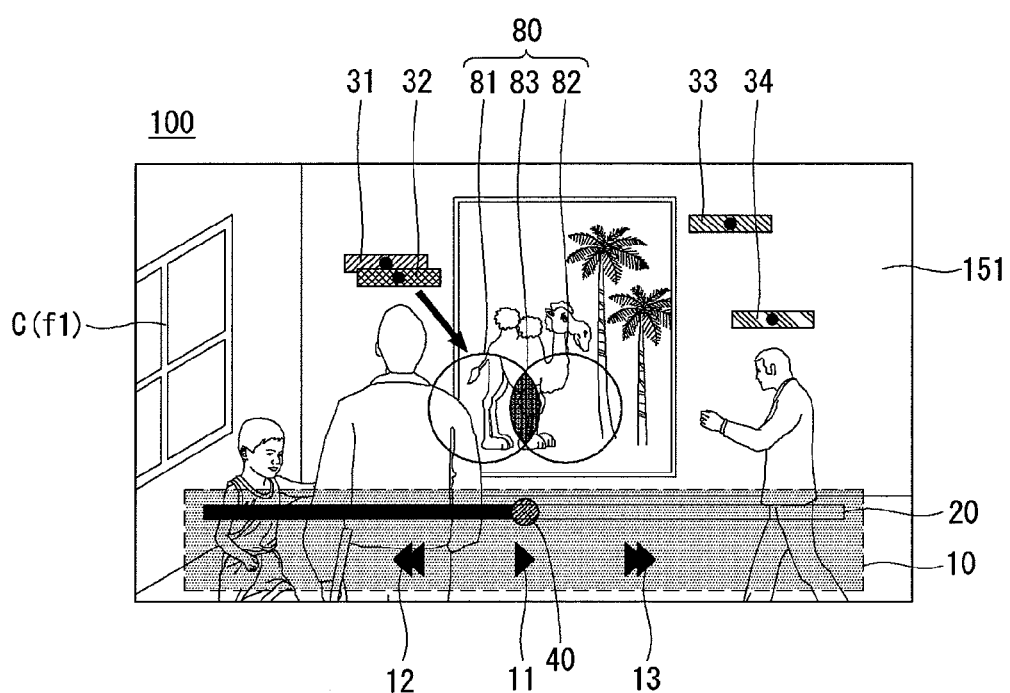
FIGS. 17 to 21 illustrate a method for controlling a mobile terminal according to a third embodiment of the present invention.
Figure 18:
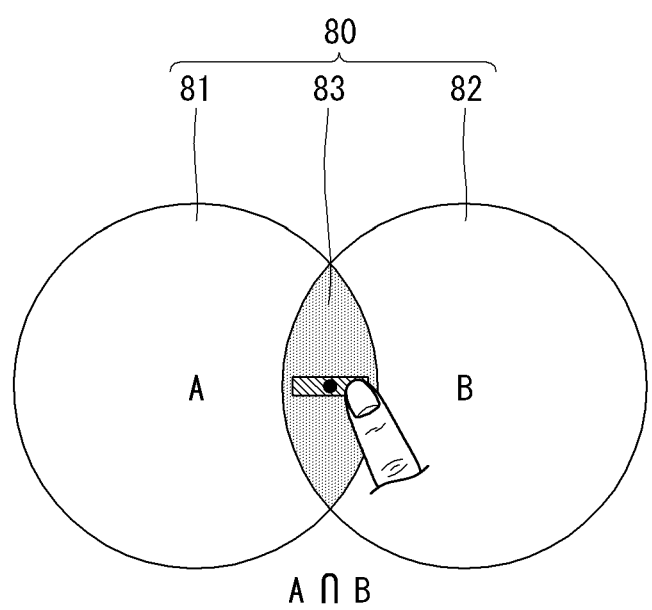

According to one embodiment, a user interface for generating an object progress bar corresponding to a new frame set by overlapping different object progress bars can be realized in the form of Venn diagram as shown in FIGS. 17 and 18.

With reference to FIG. 17, if the object progress bar 31 and the second progress bar 32 overlap with each other, a user interface 80 in the form of Venn diagram can be displayed on the touch screen 151.

The user interface 80 in the form of Venn diagram can include a first frame area 81, 82 corresponding to a first object and a second frame area 83 corresponding to a second object.

While the user interface is displayed on the touch screen 151, the controller 180 is configured to receive an input moving the first object progress bar 31 overlapping with the second object progress bar 32 into at least one of the first frame area 81, 82 and the second frame area 83.

Then the controller 180 is configured to determine a method of synthesizing a first and a second object depending on an area where the first object progress bar 31 has moved.

For example, with reference to FIG. 18, in case the first object progress bar 31 moves to a second frame area 83, the controller 180 can generate and display a new object progress bar indexing frames including both the first and the second object from among the whole frames of the video contents.

Figure 19:
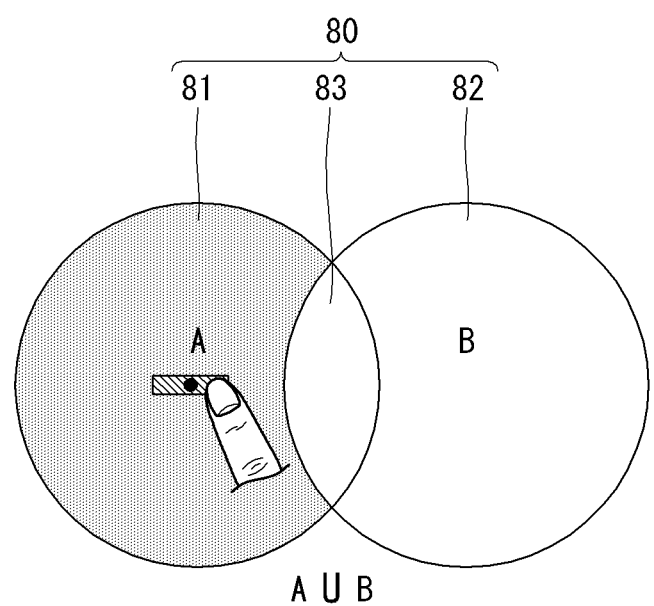

Also, with reference to FIG. 19, for example, if the first object progress bar 31 moves to the first frame area 81 or 82, the controller 180 is configured to generate and display a new object progress bar indexing frames including either of the first and second object from among the whole frames of the video contents.

A new object progress bar generated by overlapping of different object progress bars as described above can be displayed as shown in FIG. 20.

Figure 20:
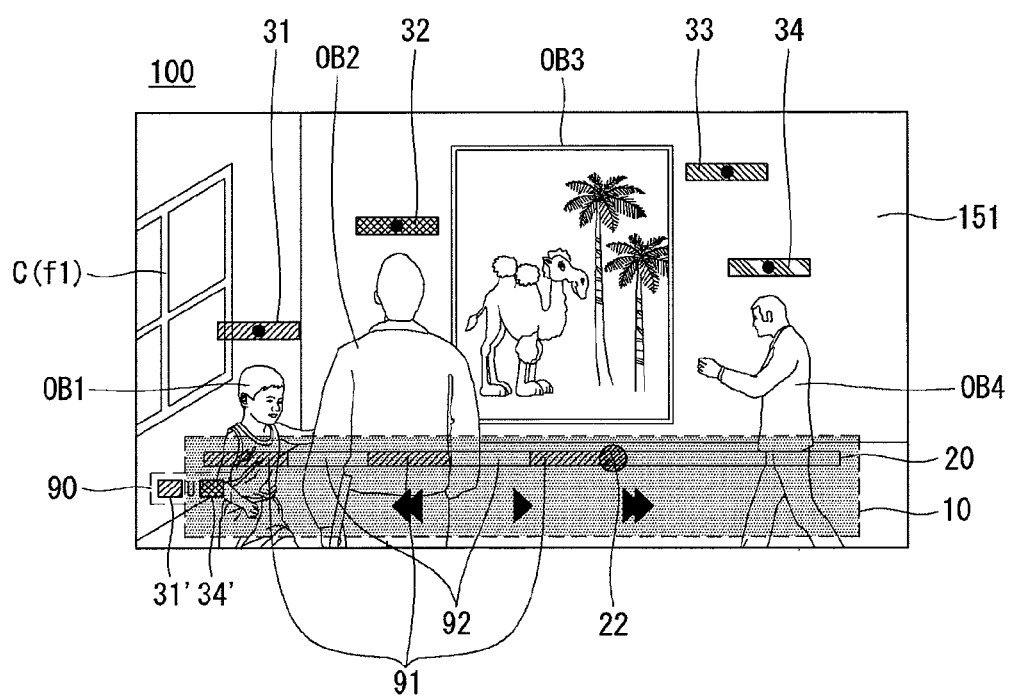

With reference to FIG. 20, each of the first object progress bar 31 to the fourth object progress bar 34 is located in the area at the top of the corresponding object. Therefore, one can distinguish which object progress bar corresponds to which object. Meanwhile, each object progress bar can be distinguished from each other by varying display attributes, for example, color, transparency, and the like.

For example, color of the first object progress bar 31 and that of the fourth object progress bar 34 are different from each other.

Meanwhile, a new progress bar 90 generated by overlapping between two progress bars can include identification information (for example, 31', 34') for identifying objects corresponding to the two progress bars.

The new progress bar 90 can be displayed on a side surface of a main progress bar 20 intended for controlling playback of video contents. If a touch input (which includes a long touch input) for selecting the new progress bar 90, the controller 180 is configured to reflect the attributes of the newly generated progress bar 90 in the main progress bar 21.

For example, the new progress bar 90 is a progress bar corresponding to a frame including one of the first OB1 to the fourth object OB4. Therefore, if an input selecting the progress bar 90 is received, the controller 180 is configured to display in the main progress bar 21 an interval 91 corresponding to a frame including one of the first OB1 to the fourth object OB4 to be distinguished from the other interval 92.

Figure 21:
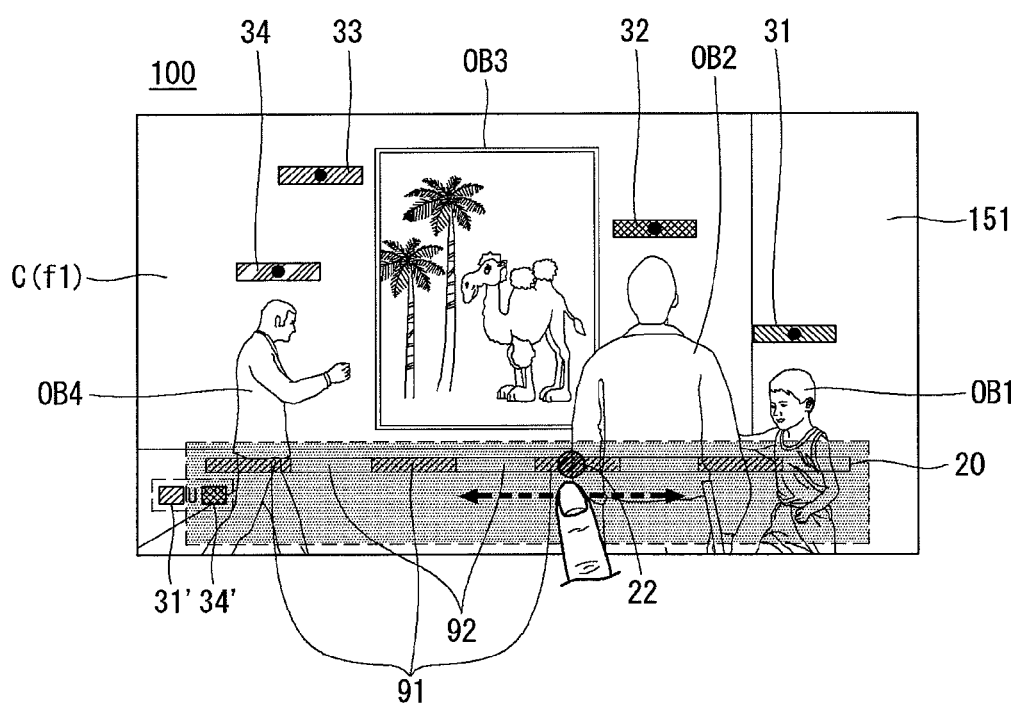

As shown in FIG. 21, if a scrubbing input is received for the progress bar 91, a frame including one of the first OB1 or fourth object OB4 can be displayed on the touch screen 151 in response to the scrubbing input.

In the embodiment described above, an object progress bar corresponding to a recognized object from video contents including a recognizable object is controlled and an operation of extracting a frame including an object desired is carried out.

However, a method of extracting a desired object through an object progress bar is not limited to the above example but can be implemented in various forms. For example, embodiments disclosed through FIGS. 22 to 29 will be described below.

Figure 22:
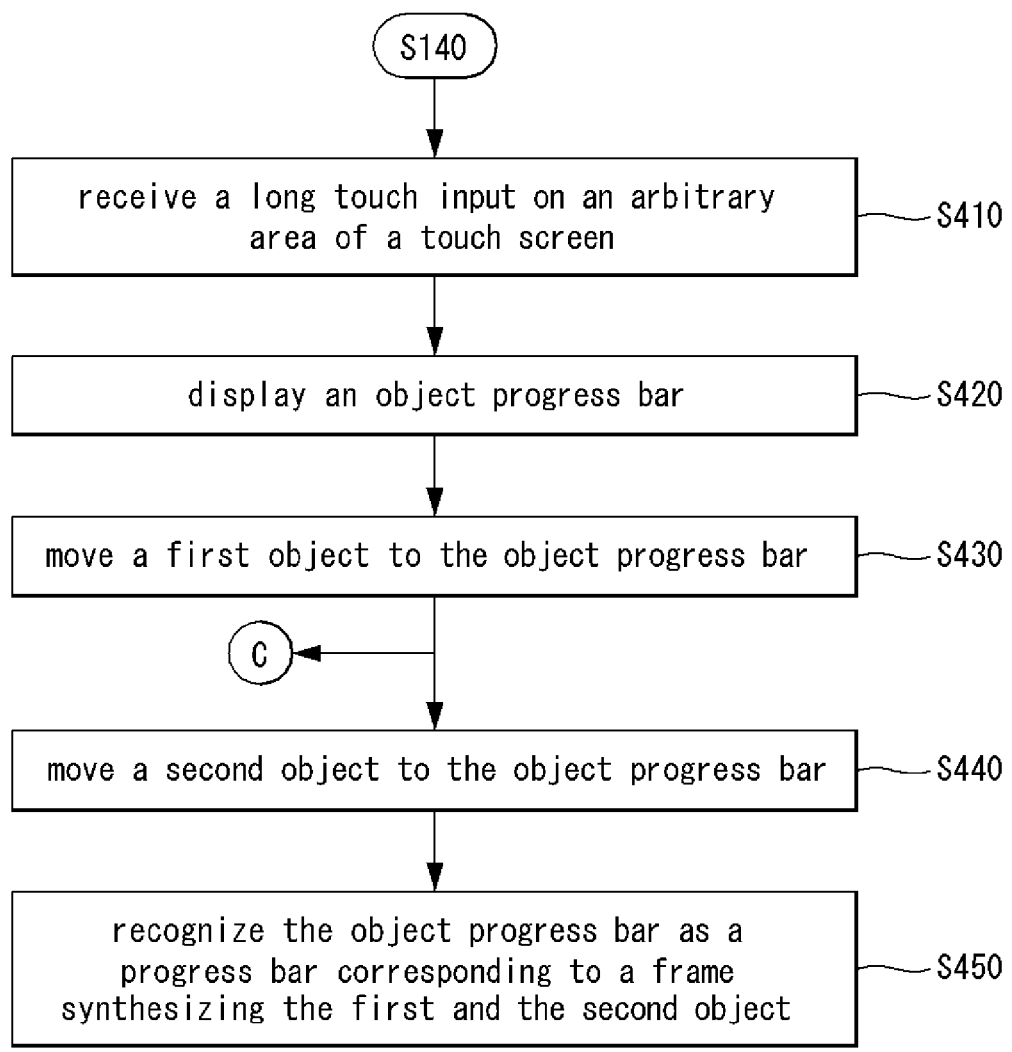
FIG. 22 is a flow diagram of a method for controlling a mobile terminal according to a fourth embodiment of the present invention.

FIG. 22 is a flow diagram of a method for controlling a mobile terminal according to a fourth embodiment of the present invention; FIGS. 23 to 29 illustrate a method for controlling a mobile terminal according to a fourth embodiment of the present invention.

With reference to FIG. 22, after at least one object is recognized when playback of video contents is stopped S140, the controller 180 is configured to receive a long touch input for an arbitrary area of the touch screen 151, 5410.

Figure 23:
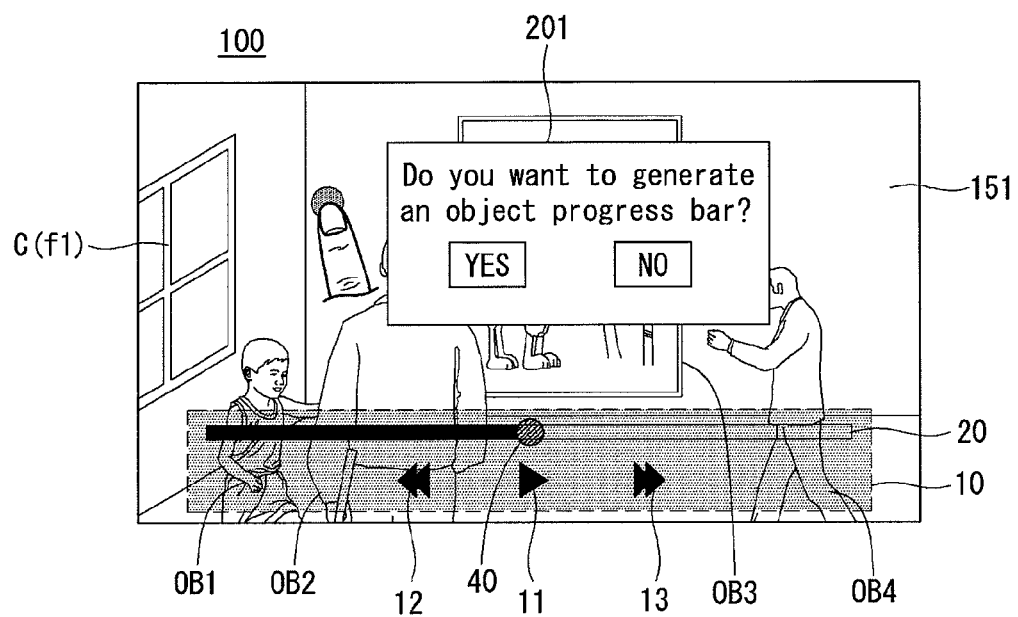
FIGS. 23 to 29 illustrate a method for controlling a mobile terminal according to a fourth embodiment of the present invention.

For example, with reference to FIG. 23, in response to the long touch input, the controller 180 is configured to display on the touch screen 151 an inquiry window 201 inquiring whether to generate an object progress bar.

Figure 24:
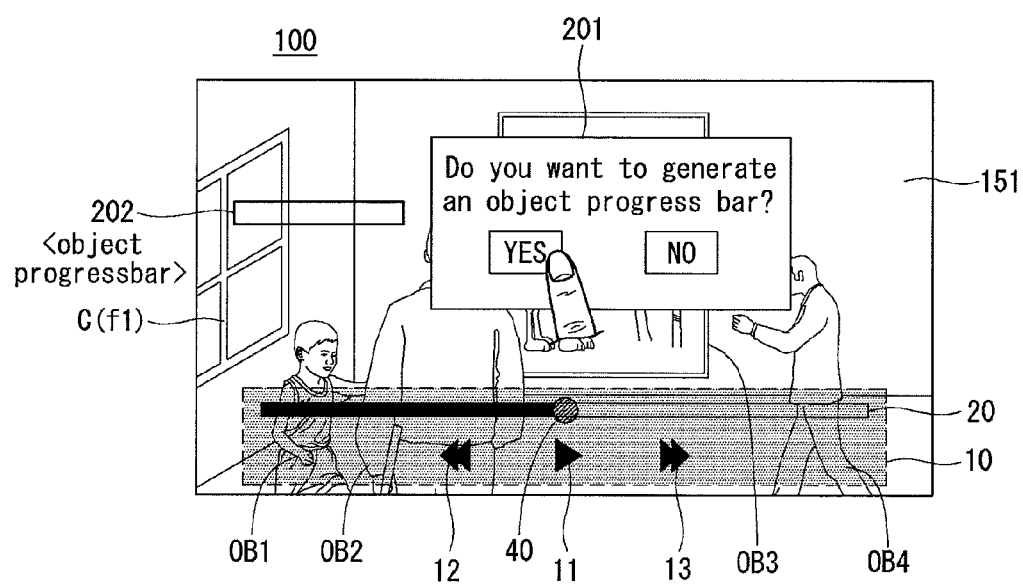

Also, with reference to FIG. 24, the controller 180 is configured to generate an object progress bar not related to any object and display the object progress bar on the touch screen 151.

Again with reference to FIG. 22, the controller 180 is configured to receive an input moving the first object directly to the object progress S430.

Figure 25:
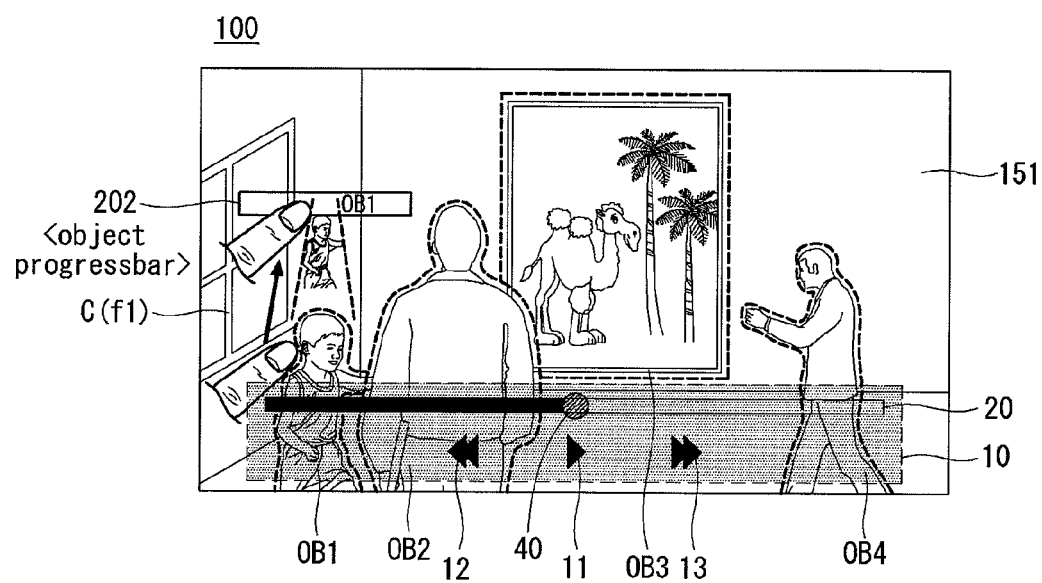

With reference to FIG. 25, an input moving the first object OB1 to an object progress bar 202 can include a touch and drag input which drags the first object OB1 to overlap with the object progress bar. The larger the overlapping area between the first object OB1 and the object progress bar 202 becomes as the first object OB1 moves toward the object progress bar 202, the apparent size of the first object can be reduced.

In other words, if the first object OB1 overlaps the object progress bar 202, the controller 180 interprets that the frames including the first object are indexed by the object progress bar 202. Accordingly, due to the user's manipulation of the object progress bar 202, only those frames including the first object OB1 can be displayed selectively C.

Figure 26:
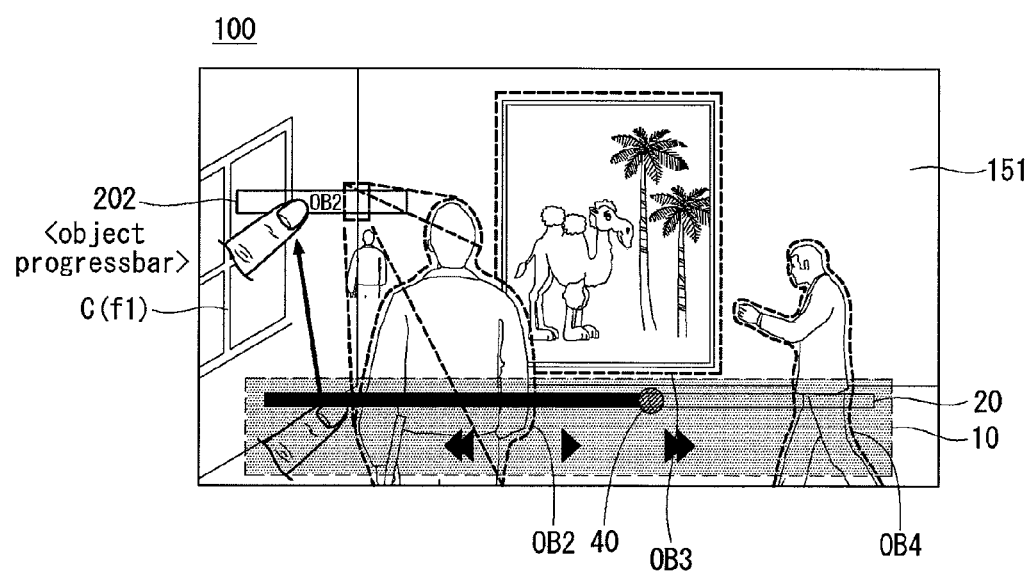

And, with reference to FIG. 26, as described above, as the first object OB1 moves toward the object progress bar 202, while it is recognized that the object progress bar 202 corresponds to the first object OB1, an input moving the second object OB2 to the object progress bar 202 can be received S440. Here, the input moving the second object OB2 toward the object progress bar 202 is the same as the first object OB1.

The frames including the second object OB2 can be indexed by the controller 180 through the object progress bar 202. In the end, the object progress bar 202 can be used as a status bar for indexing frames including the first and/or second object.

Figure 27:
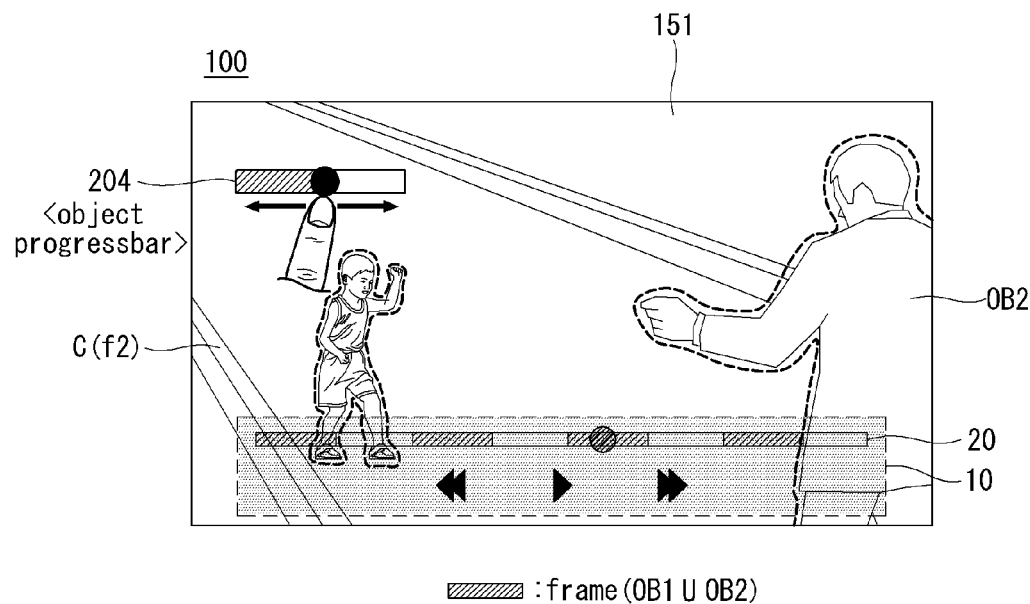

With reference to FIG. 27, an object progress bar 204 newly generated according to the embodiment of FIGS. 25 and 26 corresponds to the frames including the first OB1 and/or second object OB2. Therefore, in response to a scrubbing input about the object progress bar 204, only the frames including the first OB1 and/or OB2 are extracted from the whole frames of video contents and displayed on the touch screen 151. The controller 180 is configured to display the extracted frames on the touch screen 151 in a sequential order based on playback time.

Also, if receiving a long touch input on the object progress bar 204, the controller 180 is configured to reflect attributes (a progress bar indexing frames including both the first and the second object) of the object progress bar 204 in the main progress bar 20 for controlling playback of video contents. As a result, the controller 180 is configured to display those intervals corresponding to the frames containing both the first and the second object from among the whole frames of the video contents to be distinguished from other intervals. For example, the controller 180 is configured to display the intervals corresponding to the frames containing both the first and the second object by shading the intervals.

Figure 28:
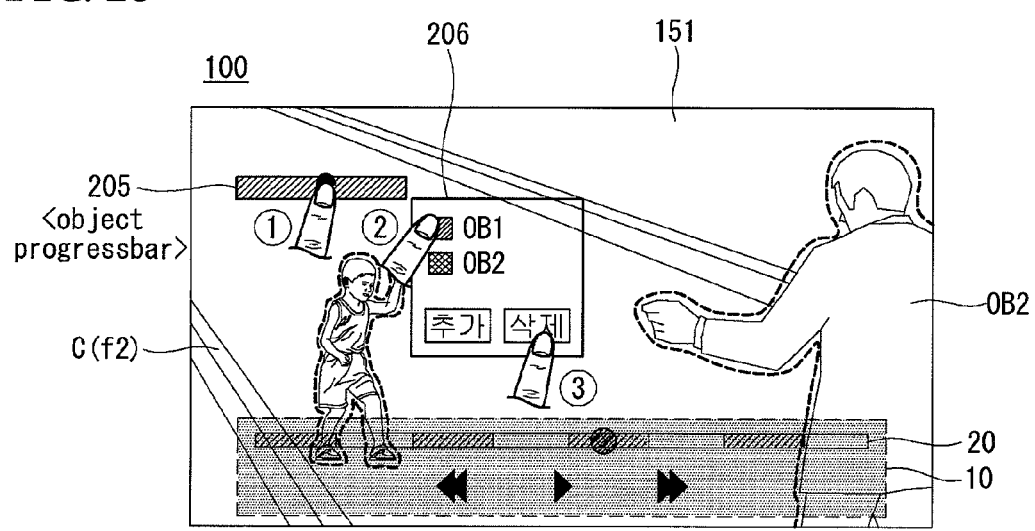

With reference to FIG. 28, if receiving a touch input for selecting an object progress bar 205, the controller 180 is configured to display on the touch screen 151 a menu window 206 for displaying attributes of the object progress bar 205.

The menu window 206 can include an item for deleting at least one object among object information OB1, OB2 corresponding to an object progress bar 205, an item for selecting an object to be synthesized additionally with the object progress bar 205, and the object information.

Figure 29:
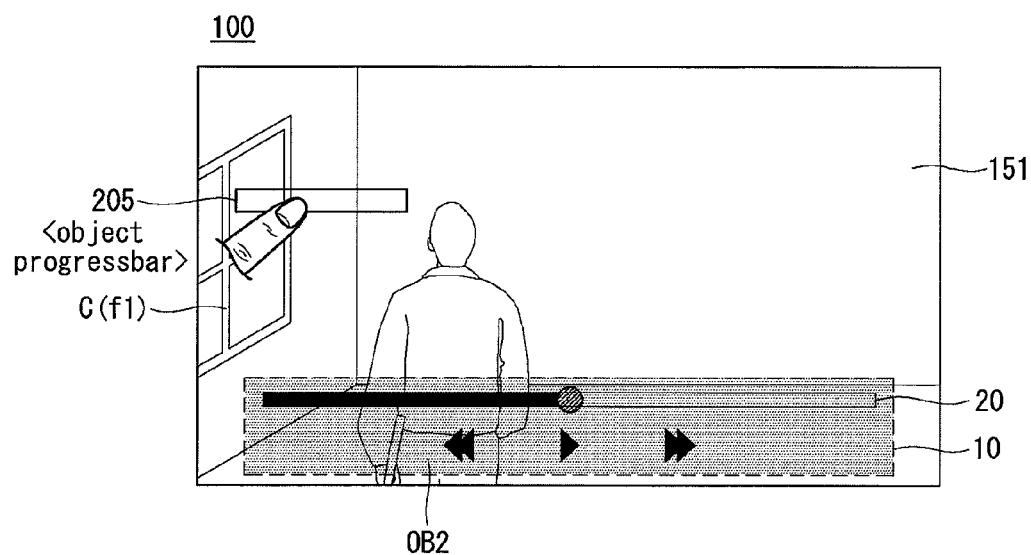

For example, in case an input for deleting the first object OB1 is received from the menu window, as shown in FIG. 29, the controller 180 is configured to display the frames including the second object OB2 selectively.

Accordingly, the object mapped onto the object progress bar 205 can be added or removed more easily.

Figure 30:
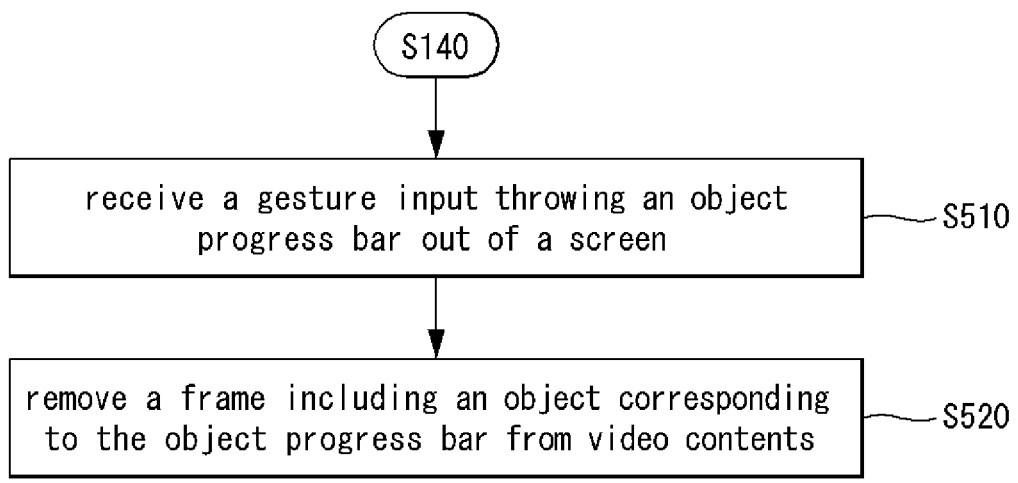
FIG. 30 is a flow diagram of a method for controlling a mobile terminal according to a fifth embodiment of the present invention.
Figure 31:
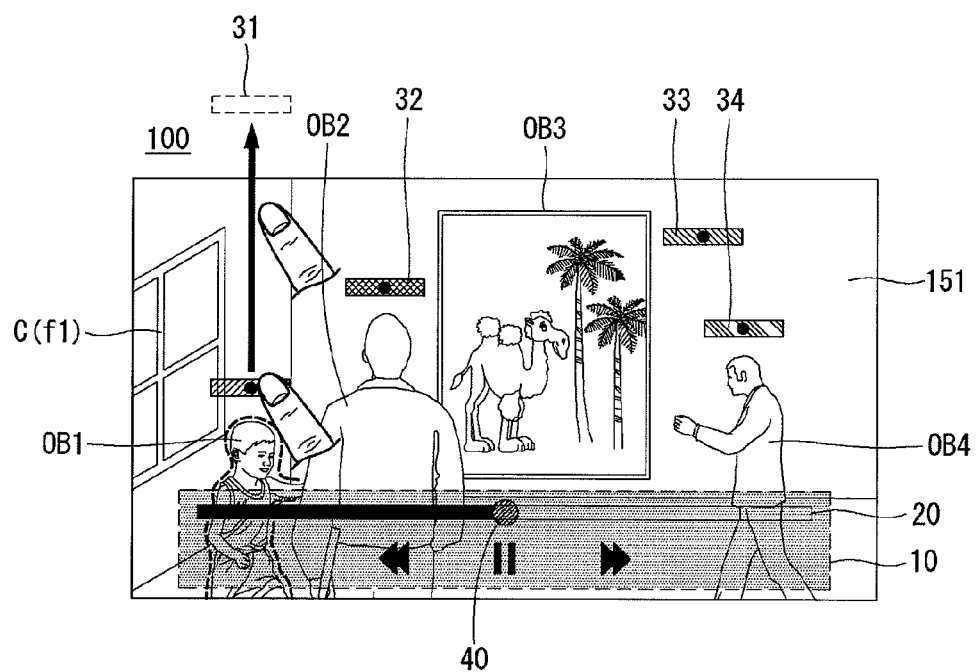
FIGS. 31 to 32 illustrate a method for controlling a mobile terminal according to a fifth embodiment of the present invention.
Figure 32:
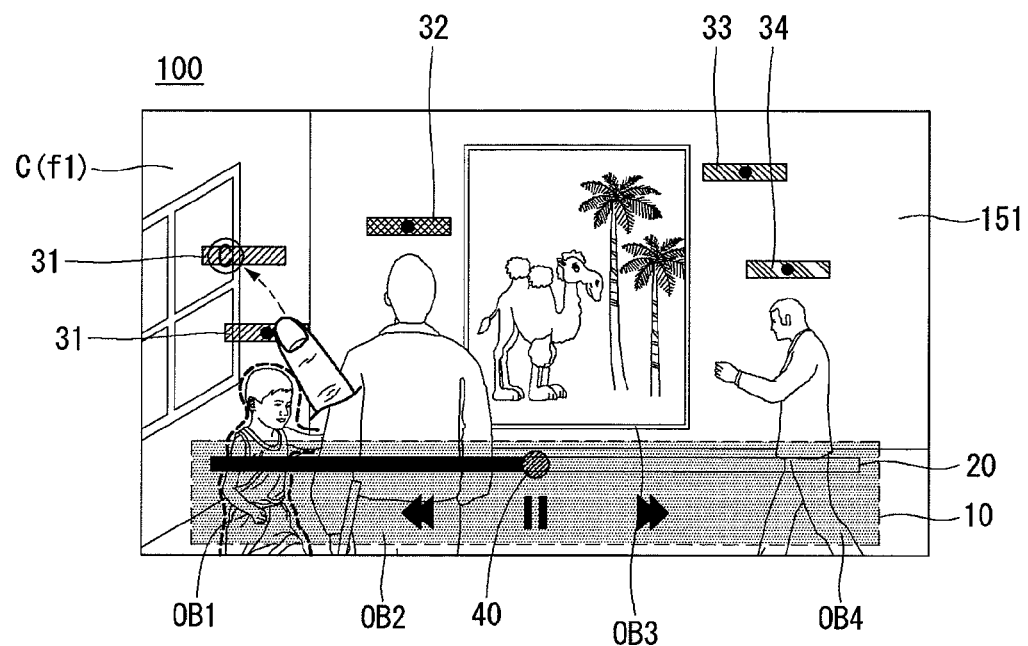

FIG. 30 is a flow diagram of a method for controlling a mobile terminal according to a fifth embodiment of the present invention; FIGS. 31 to 32 illustrate a method for controlling a mobile terminal according to a fifth embodiment of the present invention.

With reference to FIG. 30, at least one object is recognized from the screen stopped playing video contents S140. The controller 180 is configured to display object progress bars 31, 32, 33, 34 corresponding to the at least one recognized object OB1, OB2, OB3, OB4 around each object.

The controller 180, if receiving a gesture of throwing the first object progress bar 31 out of a play screen of video contents, can control the frames including the first object OB1 from among the whole frames of the video contents. Therefore, those frames including the first object OB1 may not be displayed.

With reference to FIG. 32, if a long touch input is received for the first object progress bar 31, a complimentary set symbol C can be displayed at the top of the first object progress bar 31. If an input moving the first object progress bar 31 toward the complimentary set symbol C is received, the controller 180 can control in such a what those frames containing the first object OB1 corresponding to the first object progress bar 31 are deleted during playback of video contents and played without the frames.

Also, as shown in FIGS. 31 to 32, in case frames containing a predetermined object are removed from video contents through an object progress bar, this operation can be reflected in a main progress bar for controlling playback of the video contents.

Figure 33:
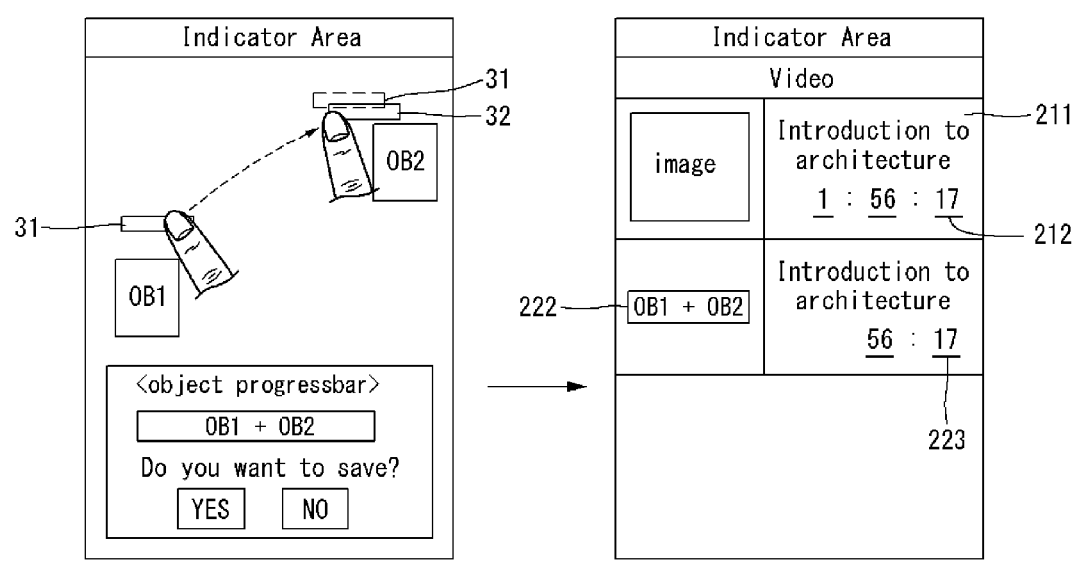
FIG. 33 is an example of storing an object progress bar generated according to a first to a fifth embodiment of the present invention.

FIG. 33 is an example of storing an object progress bar generated according to a first to a fifth embodiment of the present invention.

According to one embodiment, the controller 180 is configured to store an object progress bar.

With reference to FIG. 33, in case an input for overlapping a first object progress bar 31 with a second object progress bar 32 is received and the first object progress bar 31 and the second object progress bar 32 overlap with each other, an inquiry window inquiring whether to store a new object progress bar corresponding to at least one frame including a first OB1 and/or second object OB2 can be displayed on the touch screen 151.

And the controller 180 is configured to provide a list of video contents stored inside the mobile terminal 100. A new object progress bar 222 including first video contents 211 from the list of video contents and being capable of extracting and displaying only those frames including both the first OB1 and the second object OB2 while the first video contents 211 is played can be included in the list of video contents and displayed.

Here, the list of video contents can include play time 212 of video contents and also include contents play time 223 controlled by an object progress bar.

Figure 34:
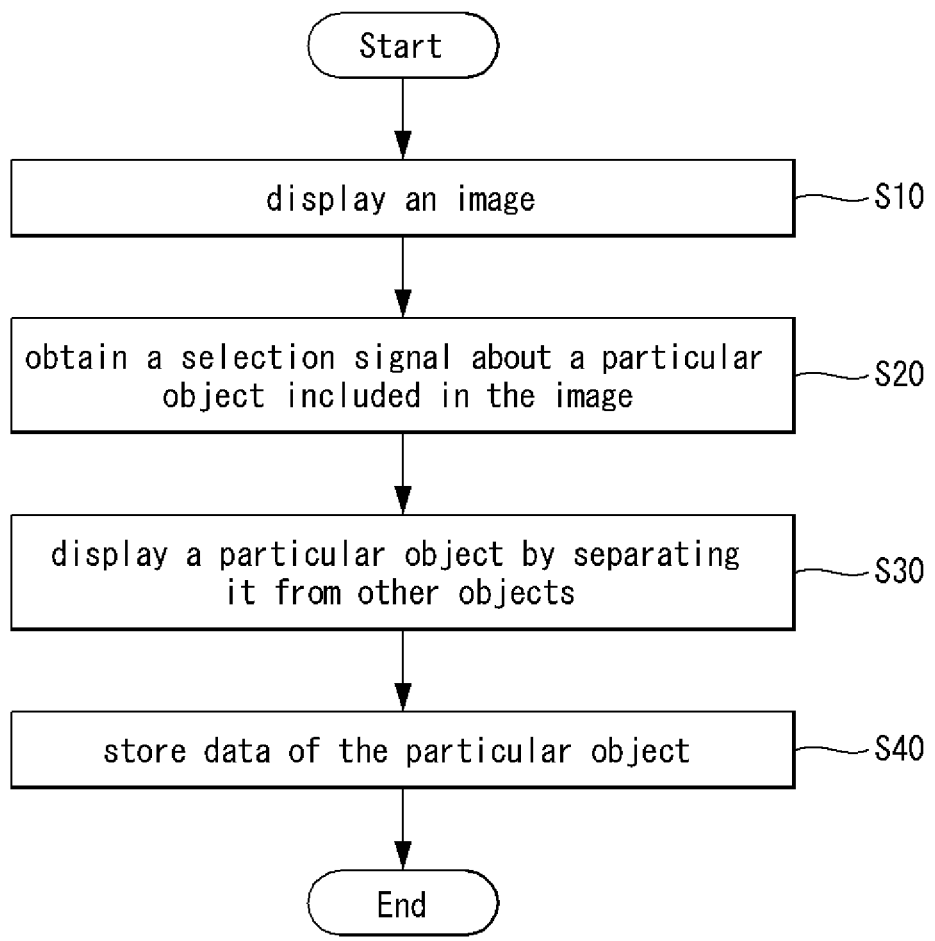
FIG. 34 is a flow diagram illustrating a method for controlling a mobile terminal according to a sixth embodiment of the present invention.

FIG. 34 is a flow diagram illustrating a method for controlling a mobile terminal according to a sixth embodiment of the present invention.

As described above, the controller 180 of the mobile terminal 100 according to one embodiment of the present invention can carry out displaying an image S610.

The image may correspond to one of an image captured through the camera 121 of the mobile terminal 100, an image captured through the camera 121, and an image obtained from another device. For example, the image may correspond to moving images captured through the camera 121. Also, the image may correspond to moving images stored in the memory 160. In other words, the image may correspond to video contents obtained from a different mobile terminal and/or server.

Obtaining a selection signal for a particular object included in an image S620 can be carried out.

At least one object can be included in the image. Various types of objects can be included therein. For example, an image of another person, an image of a particular object, and so on can be included in the image. Attributes of an object included in the image may be changes as time passes: at least one of shape, color, and position. For example, this means that the image corresponds to video images and a moving person is included in the video image.

A selection signal for a particular object included in the image can be obtained. For example, a selection signal for an image of a particular person can be obtained. Though it would be described in detail in the corresponding part of this document, a selection signal for a particular object may correspond to a touch motion of making a long touch on the object or dragging along the contour of the object.

Displaying a particular object separately from other objects S630 can be carried out.

Obtaining a selection signal about a particular object, the controller 180 is configured to recognize the object separately from other objects. For example, this means that if an image of a plurality of persons is included and one particular person is selected, the image about the selected particular person can be displayed separately from other people. Separate display may correspond to a case where a selected object is displayed after being moved from the initial position to another position.

Storing data of a particular object S40 can be carried out.

The controller 180 is configured to store a selected particular object in the memory 160. For example, in case the image corresponds to a video image, image data corresponding to a selected person from among people included in the video image can be stored. Storing data of a particular object can be carried out separately from storing the image to which the object belongs.

Figure 35:
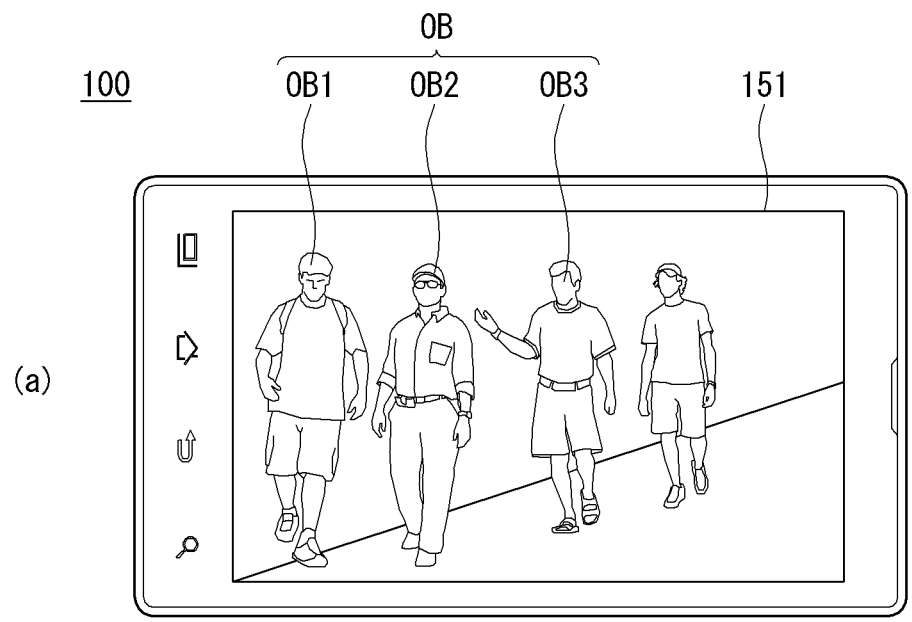
FIGS. 35 to 37 illustrate specific operation of a mobile terminal of FIG. 34.
Figure 35:
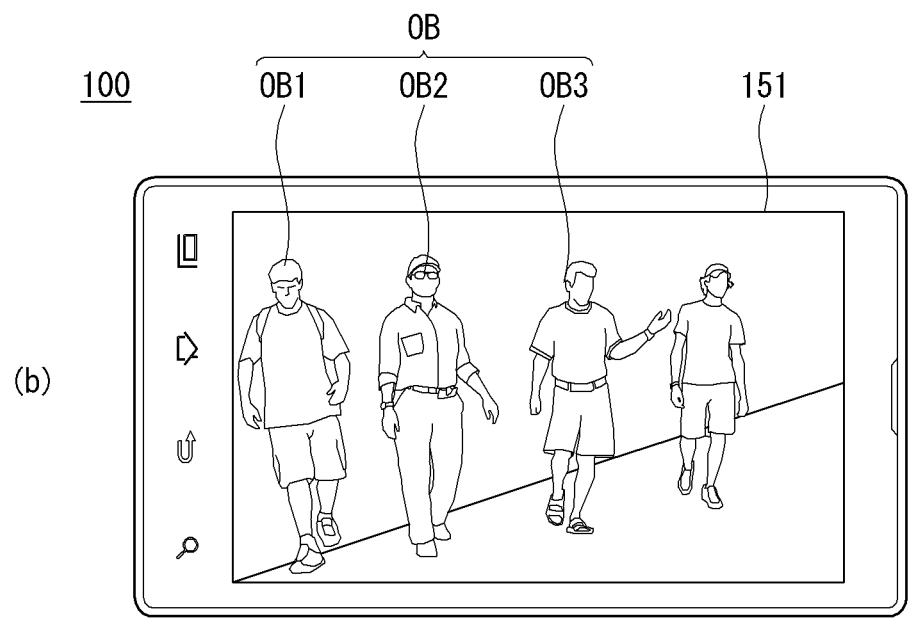
Figure 36:
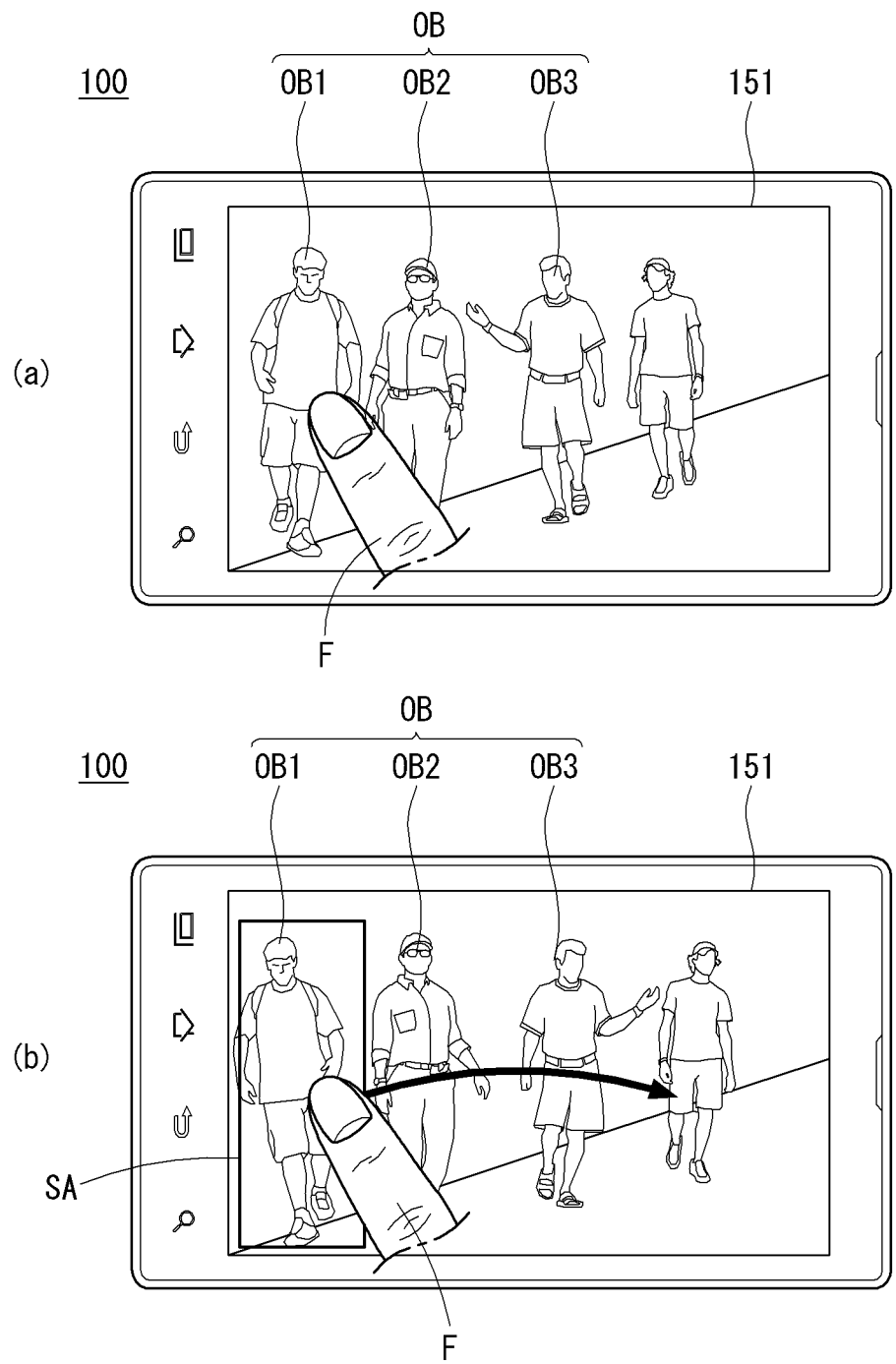
Figure 37:
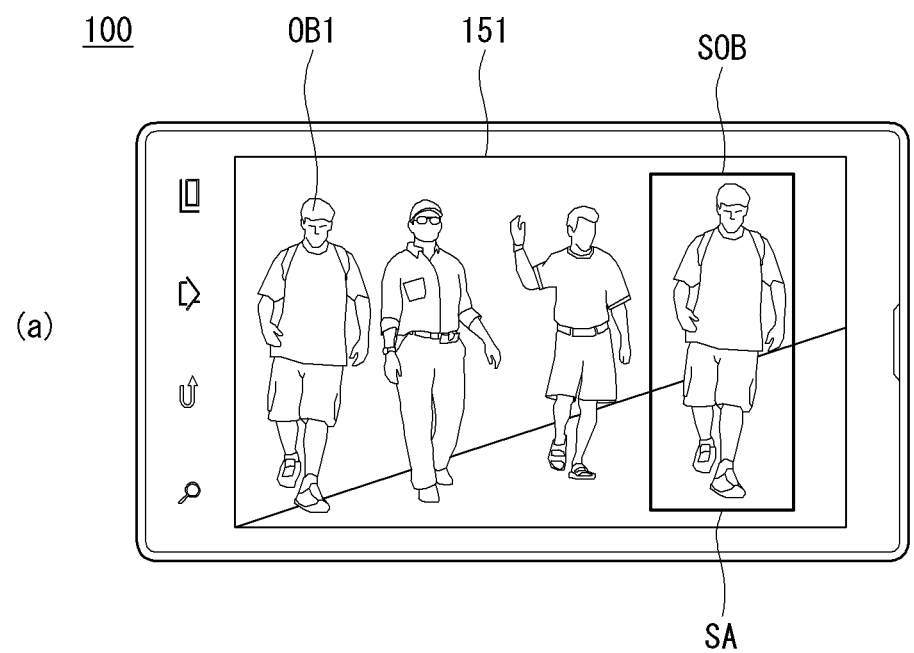
Figure 37:
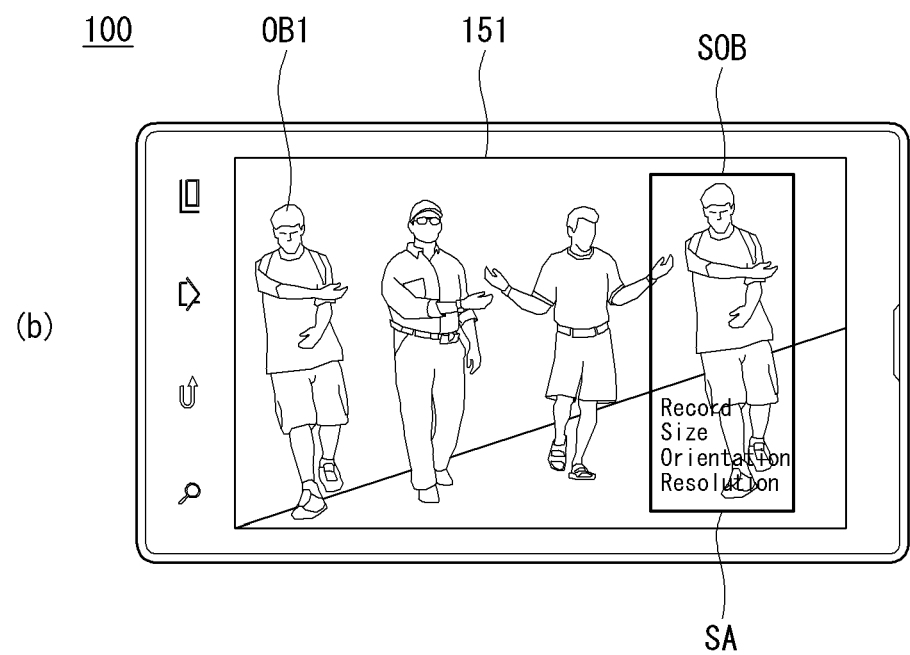

FIGS. 35 to 37 illustrate specific operation of a mobile terminal of FIG. 34.

As shown in the figure, the controller 180 of the mobile terminal 100 according to one embodiment of the present invention can separate a particular object included in the image from the initial position and display the separated particular object.

As shown in FIGS. 35(a) and (b), the display 151 can display an image including a plurality of objects OB. For example, a plurality of people images can be displayed. The plurality of objects OB can include a first to third object (OB1 to OB3).

An image not displayed on the display 151 may correspond to a video image. In other words, the image may correspond to an image changing at least one of its shape, color, and position of the object OB according as time passes.

As shown in FIG. 36(a), the user can select a particular object OB by using his or her finger F. Selection of the object OB can be carried out by such a motion as a long touch. For example, a first object OB1 can be selected by making a long touch on the first object OB1 which corresponds to a particular person among people.

As shown in FIG. 36(b), if it is recognized that the first object OB1 has been selected, the controller 180 is configured to display an area indicator SA including the recognized object. For example, an area indicator SA in the form of a rectangle including the selected first object OB1 can be displayed.

The controller 180 is configured to make display of an area except for the selected object OB blurred. For example, different from the internal area of the area indicator SA, the outside area of the area indicator SA can be shaded. If the inside and outside of the area indicator SA are shaded, the user of the mobile terminal 100 can recognize the selected object OB more clearly.

The user who selected the first object OB1 can select the position to which the first object OB1 is moved through a drag touch operation. For example, while the first object OB1 is selected, a touch motion dragging the first object OB1 to the right direction can be carried out.

As shown in FIG. 37(a), in response to a touch operation of the user, the controller 180 is configured to display the first object OB1 by separating it from the initial position. For example, the duplicate image SOB of the first object OB1 can be displayed on the display 151.

The duplicate image SOB can be displayed in the same way as an object OB selected when a video is played. For example, when the video is played, the duplicate image SOB is reproduced whereas, if playback of the video is stopped, play of the duplicate image SOB is also stopped.

As shown in FIG. 37(b), the controller 180 is configured to display a menu SA with which a particular function for the duplicate image SOB can be carried out. For example, displayed can be a menu storing the duplicate image SOB and adjusting the size, direction, and resolution thereof.

Figure 38:
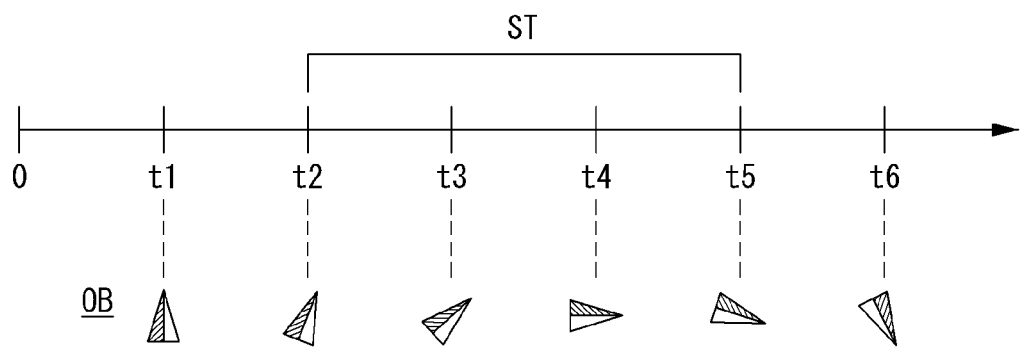
FIG. 38 illustrates display of an object according to progress of time in a sixth embodiment of the present invention.
Figure 39:
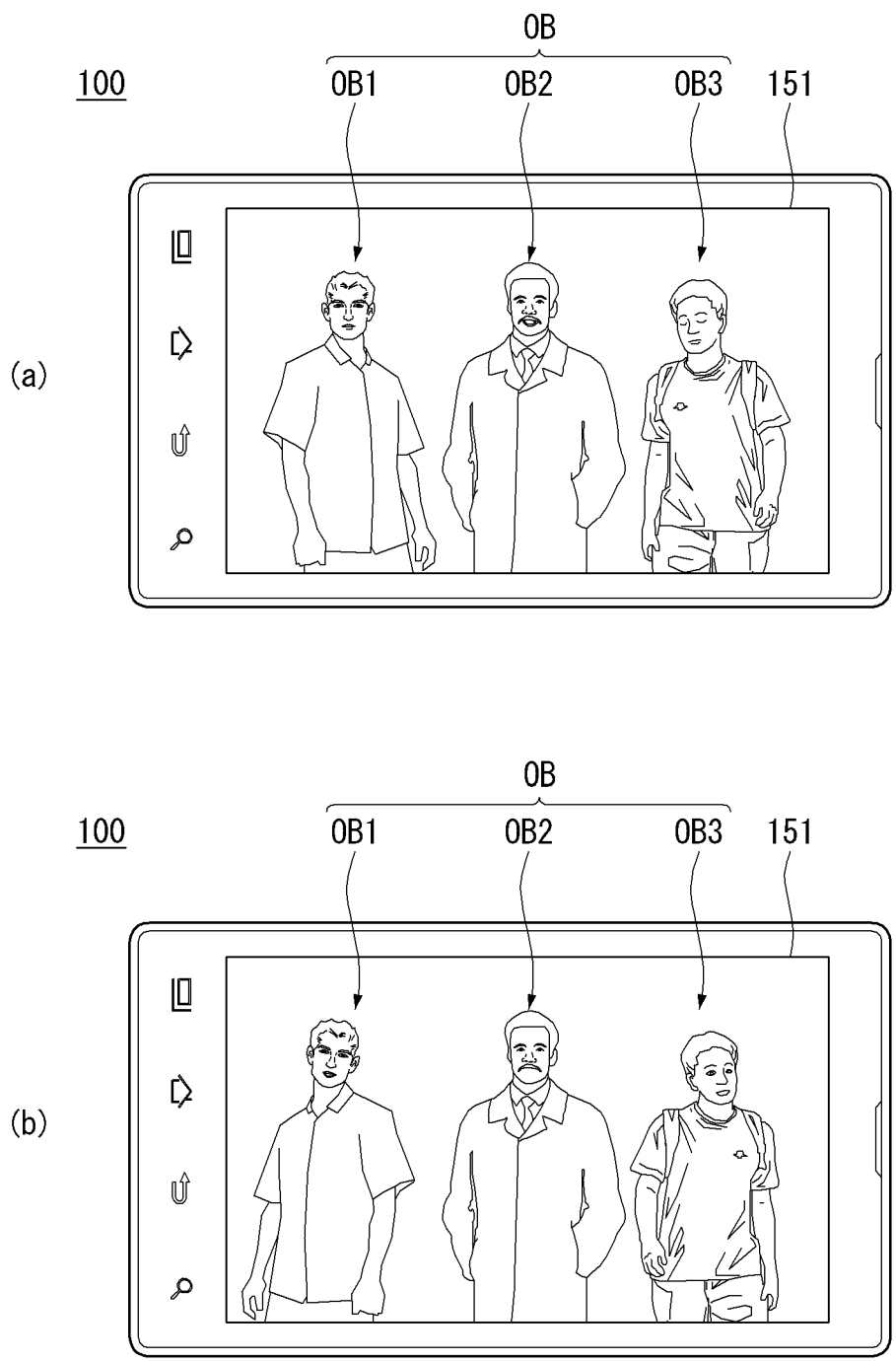
FIGS. 39 to 43 illustrate another operation of a mobile terminal according to a sixth embodiment of the present invention.
Figure 40:
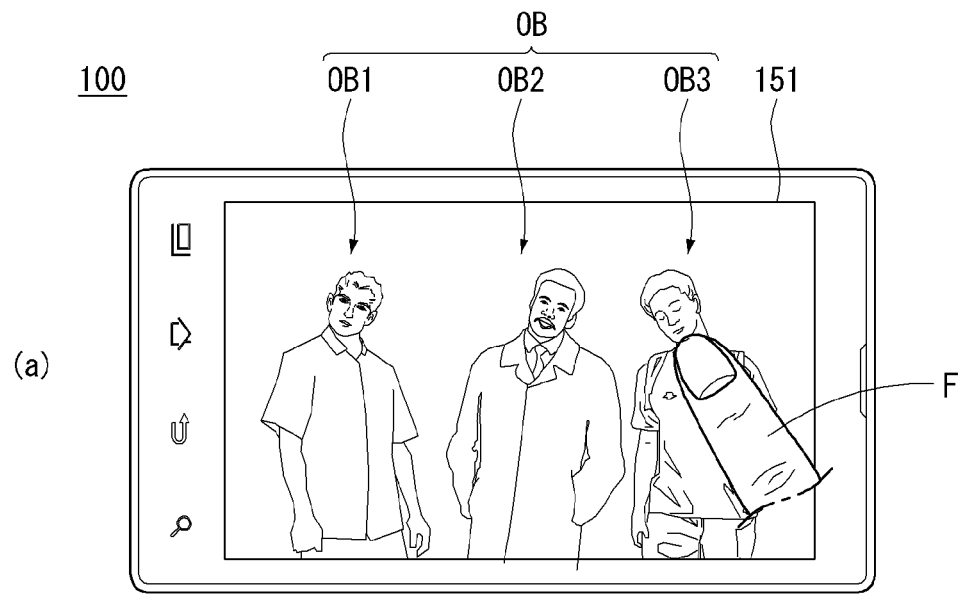
Figure 40:
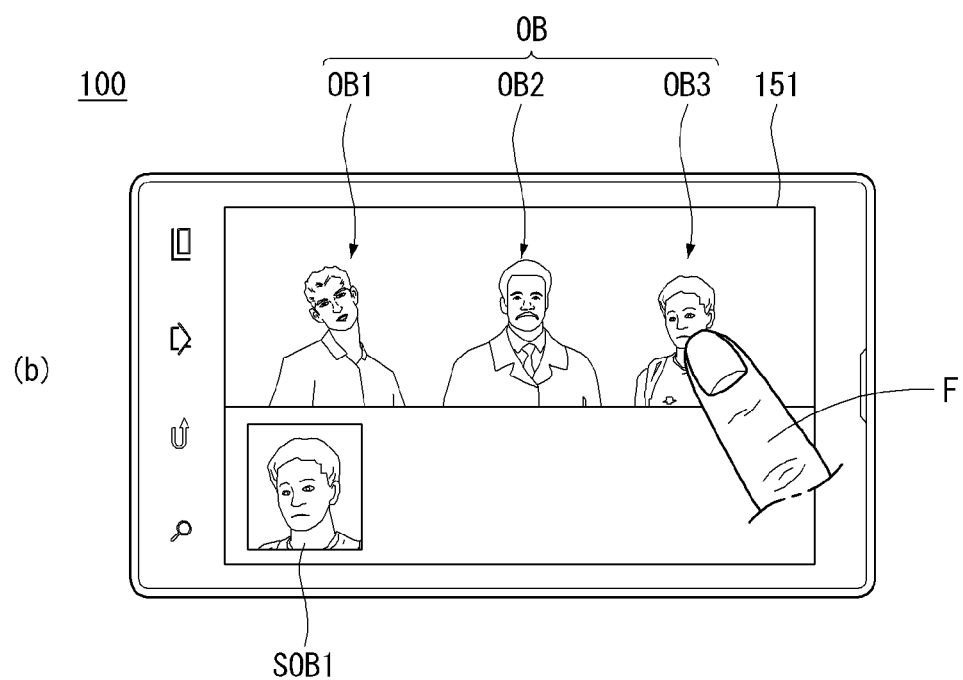
Figure 41:
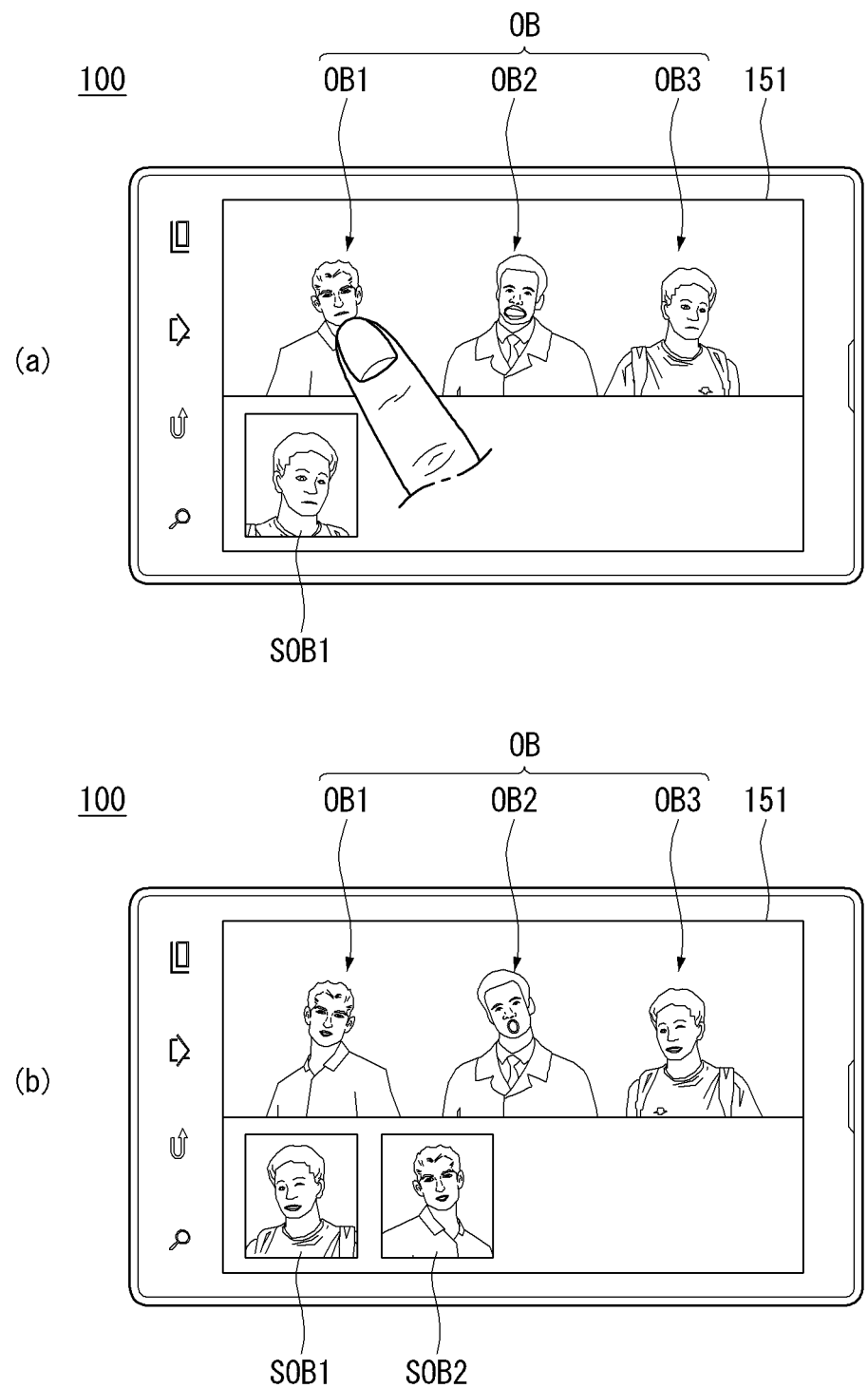
Figure 42:
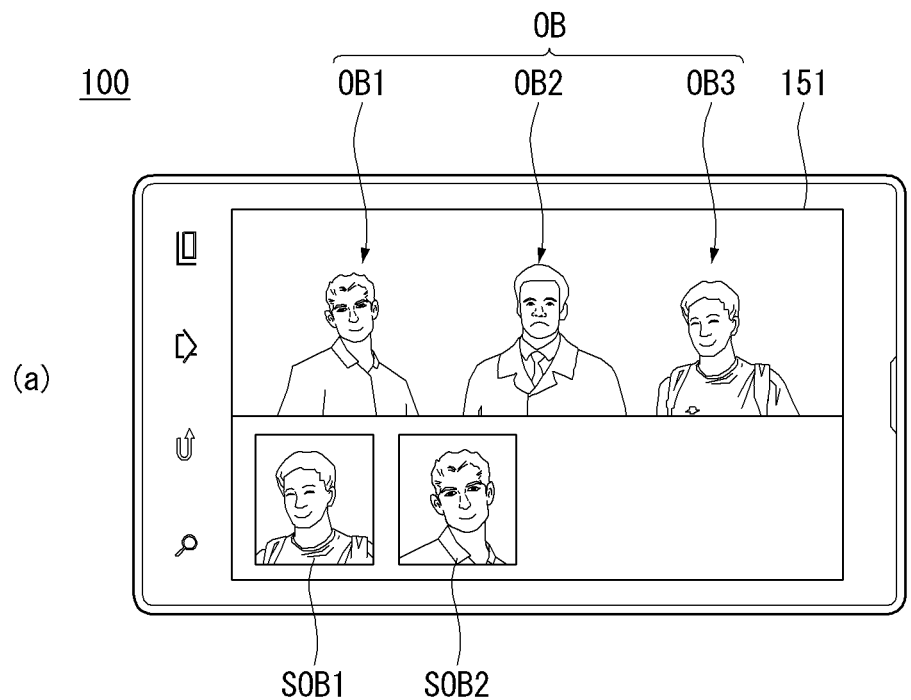
Figure 42:
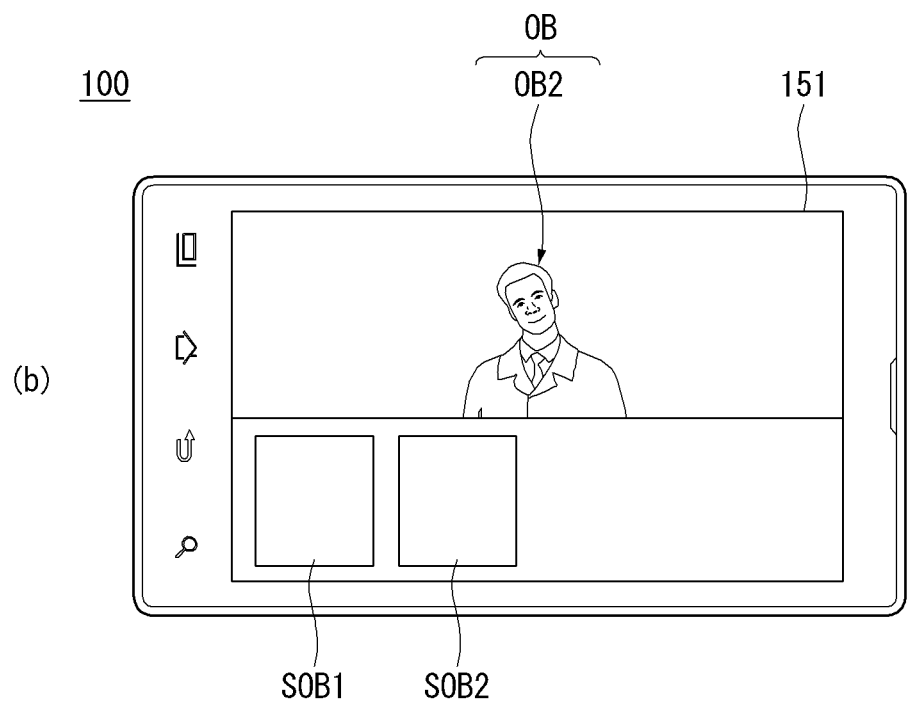
Figure 43:
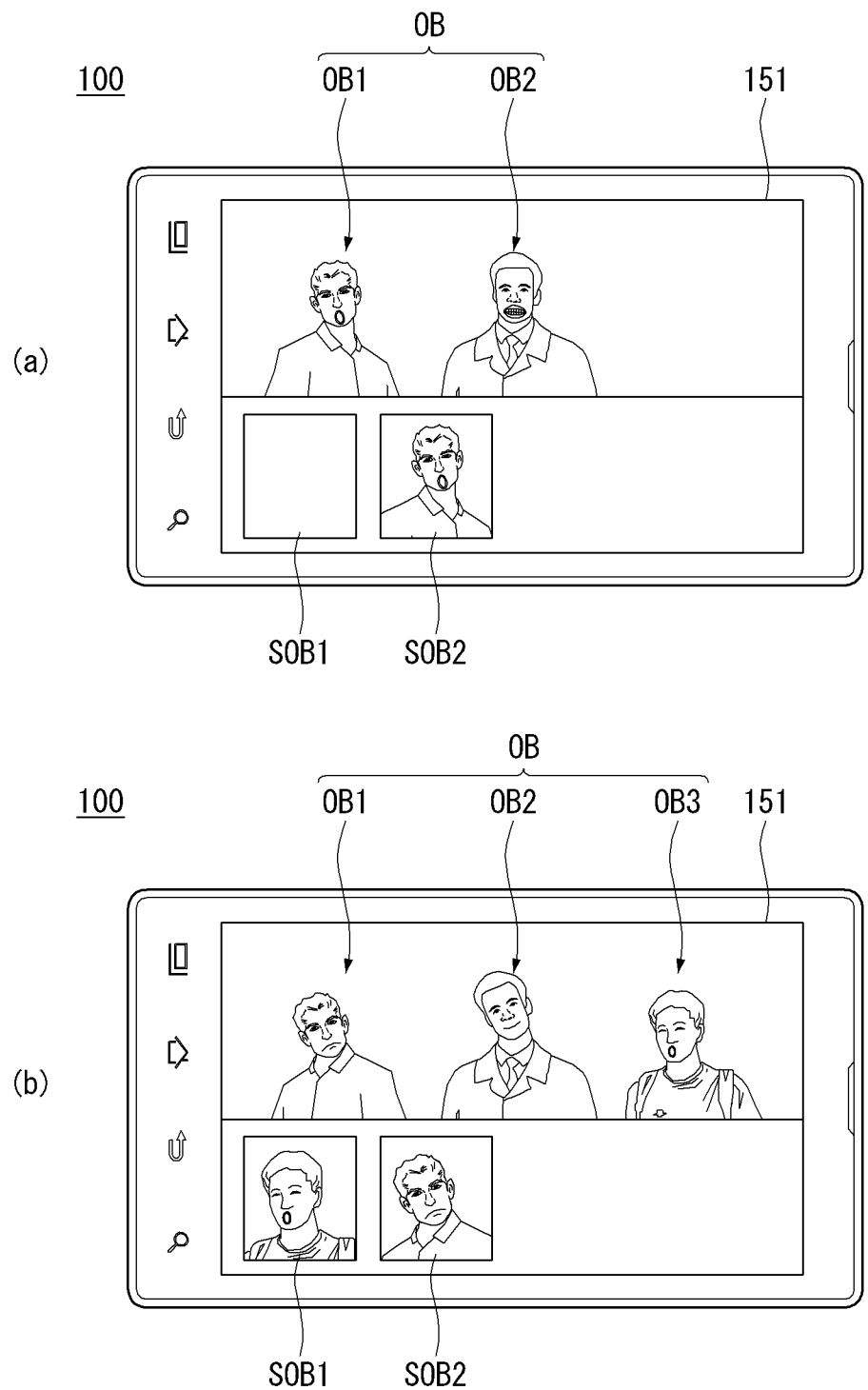

FIG. 38 illustrates display of an object according to progress of time in a sixth embodiment of the present invention.

As shown in the figure, the mobile terminal 100 according to one embodiment of the present invention selects a particular time period of a displayed object OB and stores the operation of the object within the selected time period.

At least one of the object (OB)'s shape, color, and position can be changed as times passes. For example, the shape of the object OB can be changed between t1 and t2 time point.

The user can determine the time span (ST). For example, a time period ranging from t2 to t5 can be determined as the time span (ST). The user at time point t2 can touch the object OB. In other words, it indicated that separated display of the touched object OB can be carried out from t2 time point. At t5, the user can carry out an operation of touching the object OB again. In other words, it indicates that separated display of the touched object OB can be terminated at t5 time point.

FIGS. 39 to 43 illustrate another operation of a mobile terminal according to a sixth embodiment of the present invention.

As shown in the figure, the controller 180 of the mobile terminal 100 according to one embodiment of the present invention is configured to display a selected object OB at a changed position.

As shown in FIGS. 39(a) and (b), the display 151 can display a particular image. The displayed image may correspond to an image captured through the camera 121 of the mobile terminal 100. The image may contain a plurality of objects OB. The image may correspond to moving images. In other words, it indicates that position of the object OB can be changed as time passes.

As shown in FIG. 40(a), the user can select a third object OB3, which is a particular object OB, by using his or her finger F.

As shown in FIG. 40(b), if the third object OB3 is selected, the controller 180 is configured to display a first duplicate image SOB1 corresponding to the selected third object OB3. For example, it indicates that a face image of a selected person can be displayed separately. The first duplicate image SOB1 can reflect the third object OB3 which varies continuously.

As shown in FIG. 41(a), the user can select the first object OB1 by using his or her finger F.

As shown in FIG. 41(b), the controller 180 is configured to display a second duplicate image SOB2 reflecting a first object OB1 selected. The second duplicate image SOB2 can be displayed together with the first duplicate image SOB1. In other words, the controller 180, selecting a plurality of objects OB, can display a plurality of duplicate images SOB1, SOB2 at the same time.

As shown in FIG. 42(a), the first and second duplicate image SOB1, SOB2 can be displayed on the display 151.

As shown in FIG. 42(b), the first and third object OB1, OB3 can disappear from the display 151. For example, it indicates that a person corresponding to the first and third object OB1, OB3 can get out of the field of view of the camera 121. If the first and third object OB1, OB3 disappears, the controller 180 can make the corresponding first and second duplicate image SOB1, SOB2 disappear accordingly. For example, the controller 180 is configured to make the area to which the first and the second duplicate image SOB1, SOB2 once belonged remain intact or disappear.

As shown in FIG. 43(a), the first object OB1 can reappear on the display 141. For example, it indicates that the person corresponding to the first object OB1 can enter again into the capture area of the camera 121. If the first object OB1 is displayed again, the controller 180 is configured to display again the second duplicate image SOB2 corresponding to the first object OB1.

As shown in FIG. 43(b), the third object OB3 can be displayed again. If the third object OB3 is displayed again, the controller 180 is configured to display the first duplicate image SOB1 corresponding thereto again. In other words, if the same shape as the previously selected object OB is captured, the controller 180 is configured to select and display the object OB even if a repetitive selection operation is not provided by the user.

Figure 44:
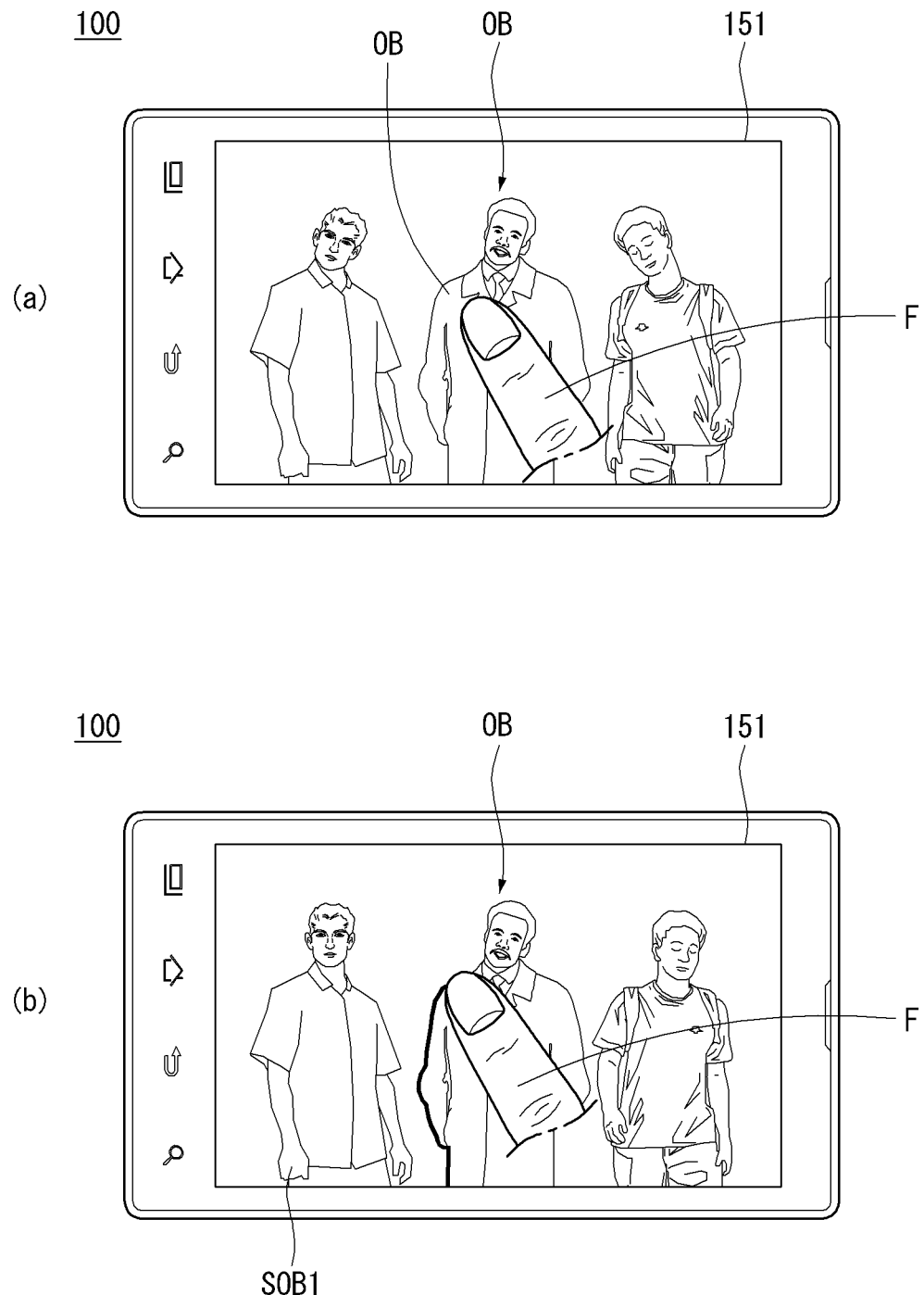
FIG. 44 is another example of selecting an object in a sixth embodiment of the present invention.

FIG. 44 is another example of selecting an object in a sixth embodiment of the present invention.

As shown in the figure, the controller 180 of the mobile terminal 100 according to one embodiment of the present invention is configured to select a particular object OB in response to various touch motions of the user.

As shown in FIG. 44(a), the user can touch the particular object OB by using his or her finger F. At this time, the touch motion may correspond to a long touch input on the particular object OB. If the particular object OB is selected, the controller 180 is configured to display an indicator OL along a contour of the selected object OB. If the indicator OL is displayed, the user can recognize more clearly the object that he or she has selected.

As shown in FIG. 44(b), the user can provide a drag touch input along the contour of the particular object OB by using his or her finger F. The controller 180 is configured to select the object OB included in the area designated by the drag and touch input.

Figure 45:
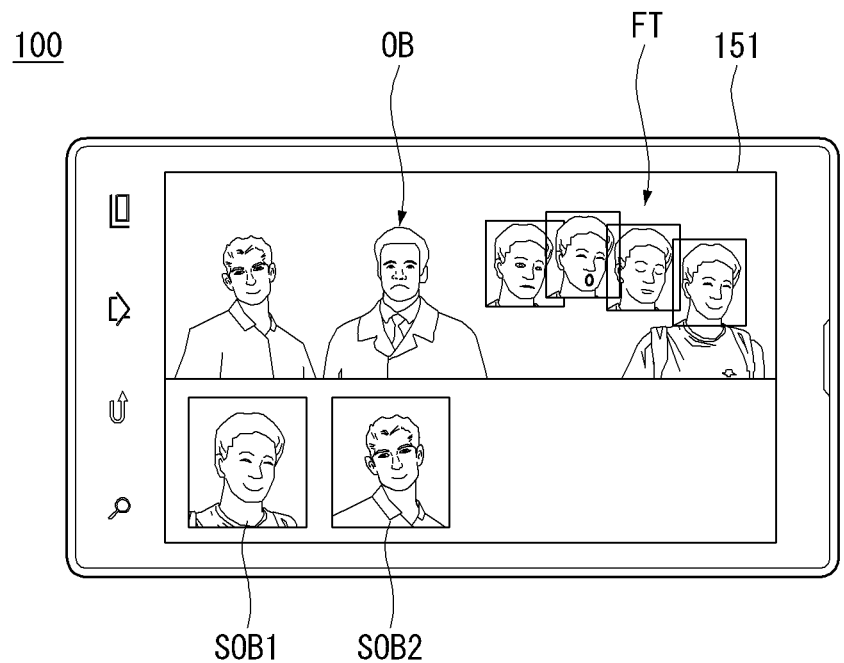
FIG. 45 is another example of displaying an object selected in a sixth embodiment of the present invention.

FIG. 45 is another example of displaying an object selected in a sixth embodiment of the present invention.

As shown in the figure, the controller 180 of the mobile terminal 100 according to one embodiment of the present invention is configured to display a selected object OB in the form of a sequence of still images FT. For example, it indicates that the shape of the object OB changing according to the progress of time can be displayed on the display 151 in the form where part of the images overlap with each other.

Figure 46:
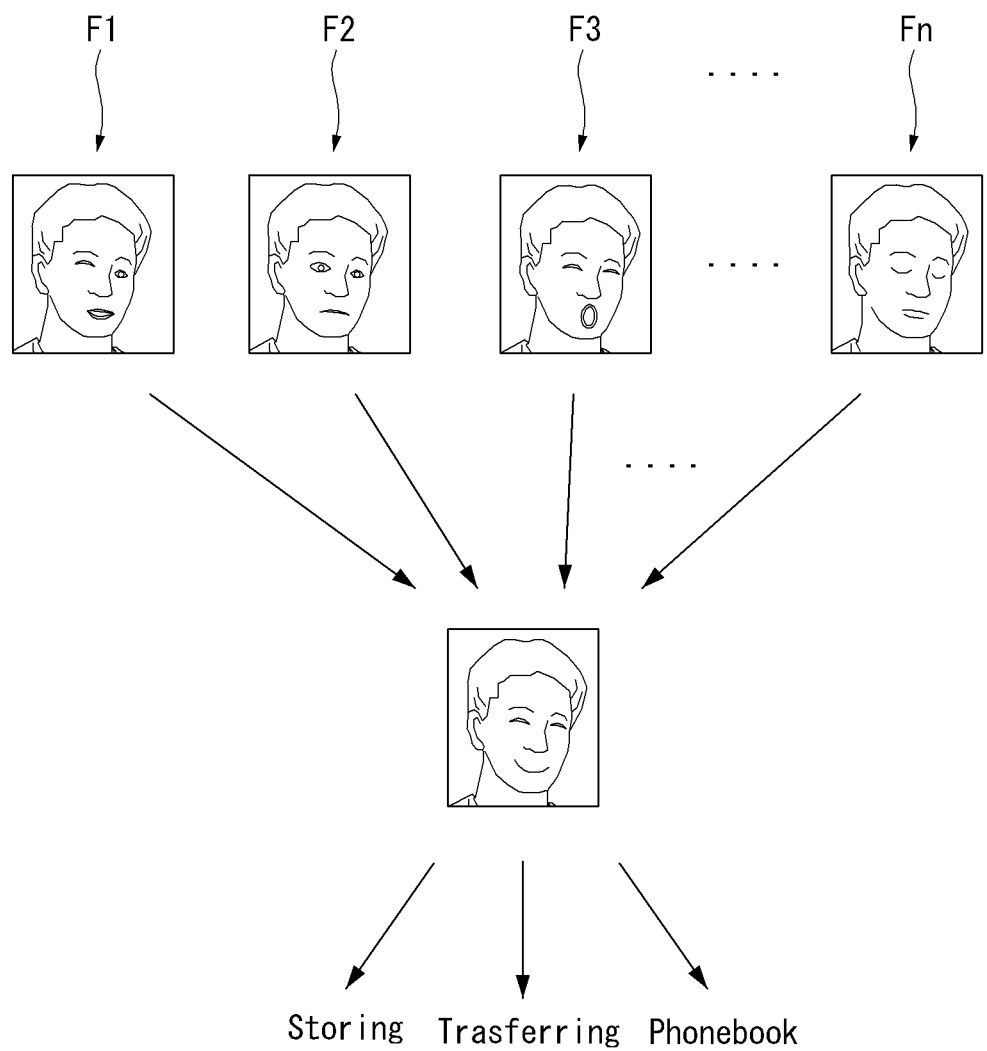
FIG. 46 is an example of using an object selected in a sixth embodiment of the present invention.

FIG. 46 is an example of using an object selected in a sixth embodiment of the present invention.

As shown in the figure, the controller 180 of the mobile terminal 100 according to one embodiment of the present invention is configured to use the image of a selected object OB for various applications.

The selected object OB can be shown as a first to n image (F1 to Fn) according to the progress of time. For example, in the case of moving images containing a smiling person, the image may correspond to a facial image according to the progress of time.

By the control operation of the controller 180 or the user's selection, a representative image F can be selected from among the first to n image (F1 to Fn).

The controller 180 can use the representative image F for various applications. For example, the controller 180 is configured to store the representative image F in the memory 160 and allow the user to use the stored image for appreciation purpose. Similarly, the representative image F can be transmitted to other devices. Also, the representative image F can be added to contact information of the user.

Figure 47:
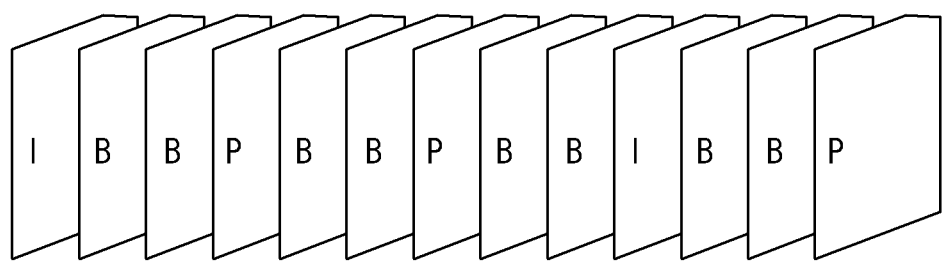
FIG. 47 illustrates a structure of an object which can be played in a mobile terminal of FIG. 1.

FIG. 47 illustrates a structure of an object which can be played in a mobile terminal of FIG. 1.

As shown in the figure, the controller 180 of the mobile terminal 100 according to one embodiment of the present invention is configured to display an image based on the data frame structure of an image to be displayed.

A video V can contain a plurality of frames. The plurality of frames can include I-frame, P-frame, and B-frame.

The I-frame refers to a self-contained frame which can be interpreted independently without referring to other images. The first image of the video may always start with the I-frame. Also, the start point of a view or re-synchronization point can start with the I-frame. In other words, it indicates that arbitrary access to a particular point of the video V can be made by using the I-frame.

The P-frame refers to a prediction frame. The P-frame can refer to a previous I-frame and/or parts of the P-frame. Although the capacity of the P-frame is small, due to complicated dependency on other I-frames and/or P-frames, the P-frame can be sensitive to transmission error.

The B-frame can refer to both a previous and subsequent frame.

The controller 180 is configured to use the I-frame when displaying an image at another position or extracting an image. Also, the controller 180 is configured to use the I-frame when displaying a sequence of continuous still images (FT of FIG. 45).

A mobile terminal and a method for controlling the mobile terminal according to one embodiment of the present invention provide the following advantages.

According to the present invention, a user can enjoy a frame including a particular object selectively from video contents through an intuitive user interface.

In particular, the present invention can recognize a predetermined object from video contents, generate a progressive bar specific to the recognized object, and select and provide a frame containing an object desired by the user through a simple operation on the object-specific progress bar or scroll bar.

Also, according to the present invention, the user can edit frames of the video contents containing at least one object more easily by using a recognized object from the video contents.

Also, according to the present invention, a selected object can be separated from its original position and displayed at another position.

A method for controlling a mobile terminal according to the present invention described above can be provided being recorded in a recording medium which can be readable by a computer in the form of a program to be carried out in a computer.

The method for controlling a mobile terminal according to the present invention can be carried out by software. When the method is carried out by software, means constituting the present invention are code segments carrying out necessary tasks. Programs or code segments are stored in a medium readable by a processor or transmitted by a transmission medium or a computer data signal combined with carrier waves through a communication network.

A recording medium readable by a computer comprises all kinds of recording apparatus which stores data readable by a computer system. Examples of a recording apparatus which can be readable by a computer include ROM, RAM, CD-ROM, DVD±ROM, DVD-RAM, magnetic tape, floppy disk, hard disk, optical data storage device, and the like. Also, a recording medium readable by a computer can be distributed across computer devices connected to each other through a network and codes readable by a computer in a distributed manner can be stored and carried out.

Since the present invention described so far can be substituted, modified, or changed in various ways without by those skilled in the art to which the present invention belongs departing from the technical principles and scope of the present invention, the present invention are not limited by embodiments and appended drawings described above. Also, those embodiments described in this document are not limited to the present form but the whole or part of the embodiments can be selectively combined to allow various modifications of the present invention.

What is claimed is:

1. A mobile terminal, comprising:
a touch screen configured to display a first bar for controlling a play screen of video contents and playback of the video contents; and
a controller configured to:
stop playback of the video contents when an input for stopping playback of the video contents is received,
recognize objects included in the play screen when the playback of the video contents is stopped, wherein the recognized objects comprise a first object and a second object,
generate a second bar corresponding to each of the recognized objects by indexing all frames including each recognized object from among the whole frames of the video contents, wherein the second bar is composed of only the frames including each recognized object, wherein the number of the generated second bars is equal to the number of the recognized objects,
display each second bar corresponding to the recognized object, respectively around each recognized object,
receive an input to overlap a second bar corresponding to the first object with a second bar corresponding to the second object, and
display on the touch screen a user interface for generating a third bar corresponding to a new frame set generated by synthesizing the first object and the second object.

2. The mobile terminal of claim 1, wherein a plurality of frames including the recognized objects is grouped according to a playback order, and the grouped frames are indexed to the second bar.

3. The mobile terminal of claim 1, wherein the first bar includes a progress icon indicating a current position within the video contents.

4. The mobile terminal of claim 1, wherein the second bar includes a progress icon indicating a current position of a frame including the recognized object within the video contents.

5. The mobile terminal of claim 4, wherein the controller is configured to display on the touch screen a frame corresponding to a position of a touch input when an input for moving the touch input on a progress icon of the second bar along a predetermined direction is received.

6. The mobile terminal of claim 5, wherein the predetermined direction corresponds to left and right direction along the second bar.

7. The mobile terminal of claim 5, wherein the controller is configured to change position of a progress icon included in the first bar for indicating a current position of the frame within the video contents according as the frame displayed on the touch screen is changed.

8. The mobile terminal of claim 5, wherein the controller is configured to recognize at least one object included in a frame displayed on the touch screen when a touch input on a progress icon of the second bar is released and display the second bar corresponding to the recognized object on the touch screen.

9. The mobile terminal of claim 1, wherein the input for stopping playback of the video contents comprises a voice command for stopping an input on a stop icon displayed on the first bar or playback of video contents.

10. The mobile terminal of claim 1, wherein the recognized objects comprise at least one from among at least one person, at least one thing, a background included in the video contents, and at least one object included in the background.

11. The mobile terminal of claim 1, wherein the user interface includes a second frame area including a first frame area including either of the first and the second object, the first object, and the second object, and
wherein the controller is configured to set up a frame mapped to a third bar differently according to an area at which the second bar is positioned, when an input for moving a second bar corresponding to the first object to either of the first and second frame area is received.

12. The mobile terminal of claim 11, wherein, in case the second bar corresponding to the first object is positioned in the first frame area, the third bar generated corresponds to a frame including either of the first object and the second object from among the video contents.

13. The mobile terminal of claim 11, wherein, in case the second bar corresponding to the first object is positioned in the second frame area, the third bar generated corresponds to a frame including the first object and the second object from among the video contents.

14. The mobile terminal of claim 11, wherein, in case the second bar corresponding to the first object enters either of the first and the second frame area, the controller is configured to change display attributes of a frame area in the user interface into which the second bar enters.

15. The mobile terminal of claim 11, wherein the third bar includes identification information for identifying a form synthesizing the first object and the second object.

16. The mobile terminal of claim 11, wherein the controller is configured to change display attributes of the first bar in such a way that a frame interval corresponding to the third bar from among the frames corresponding to the first bar is differentiated from other frame intervals.

17. The mobile terminal of claim 1, wherein, in case a touch input making the second bar get out of the touch screen is received, a frame including an object corresponding to the second bar is removed from the video contents.

18. The mobile terminal of claim 17, wherein the controller is configured to display on the touch screen identification information for indicating removal of a frame including an object corresponding to the second bar from the video contents.

19. A mobile terminal, comprising:
a touch screen configured to display a progress bar for controlling a play screen of video contents and playback of the video contents; and
a controller configured to:
recognize objects, the recognized objects comprising a first object and a second object,
generate a bar corresponding to each of the recognized objects by indexing all frames including each recognized object according to a playback order associated with the recognized objects, when the playback of the video contents is stopped, wherein the bar is composed of only the frames including each recognized object,
display on the touch screen a frame corresponding to the particular position from among the indexed frames when an input for selecting a particular position of the bar is received, wherein the number of the generated bars is equal to the number of the recognized objects,
display each generated bar around the recognized objects,
receive an input to overlap a second bar corresponding to the first object with a second bar corresponding to the second object, and
display on the touch screen a user interface for generating a third bar corresponding to a new frame set generated by synthesizing the first and second object.

20. A method for controlling a mobile terminal, comprising:
displaying on the touch screen a first bar for controlling a play screen of video contents and playback of the video contents;
receiving a predetermined input for the touch screen;
stopping playback of the video contents in response to the predetermined input;
recognizing objects included in the play screen when the playback of the video content is stopped, the recognized objects comprising a first object and a second object;
generating a second bar corresponding to each of the recognized objects by indexing all frames including each recognized object from among the whole frames of the video contents, wherein the second bar is composed of only the frames including each recognized object, wherein the number of the generated second bars is equal to the number of the recognized objects;
displaying each second bar corresponding to the recognized object, respectively around the recognized objects;
receiving an input to overlap a second bar corresponding to the first object with a second bar corresponding to the second object; and
displaying on the touch screen a user interface for generating a third bar corresponding to a new frame set generated by synthesizing the first object and the second object.

* * * * *